United States Patent
Chabanas et al.

(10) Patent No.: US 9,514,533 B2
(45) Date of Patent: *Dec. 6, 2016

(54) METHOD FOR DETERMINING BONE RESECTION ON A DEFORMED BONE SURFACE FROM FEW PARAMETERS

(71) Applicant: A2 Surgical, Le Mans (FR)

(72) Inventors: Laurence Chabanas, Saint-Pierre-d'Allevard (FR); Stéphane Lavallee, St Martin d'Uriage (FR); Jérôme Tonetti, Grenoble (FR); Thomas Byrd, Nashville, TN (US); Bryan Talmadge Kelly, Riverside, CT (US); Christopher Larson, Edina, MN (US)

(73) Assignee: Smith & Nephew, Inc., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,287

(22) Filed: Mar. 26, 2015

(65) Prior Publication Data

US 2015/0269727 A1 Sep. 24, 2015

Related U.S. Application Data

(63) Continuation of application No. 13/704,510, filed as application No. PCT/IB2011/001683 on Jun. 16, 2011, now Pat. No. 9,020,223.

(Continued)

(51) Int. Cl.
*G06K 9/00* (2006.01)
*G06T 7/00* (2006.01)
(Continued)

(52) U.S. Cl.
CPC ............... *G06T 7/0012* (2013.01); *G06T 3/60* (2013.01); *G06T 5/002* (2013.01); *G06T 17/30* (2013.01);
(Continued)

(58) Field of Classification Search
USPC .................................................. 382/128–134
See application file for complete search history.

(56) References Cited

U.S. PATENT DOCUMENTS 5,682,886 A * 11/1997 Delp et al. ..................... 600/407
5,995,738 A * 11/1999 DiGioia et al. ................. 703/11
(Continued)

OTHER PUBLICATIONS

Patent Examination Report No. 1 for Australian Patent Application No. 2011284468 dated May 7, 2014, 5 pages.

(Continued)

*Primary Examiner* — Alex Liew
(74) *Attorney, Agent, or Firm* — Burns & Levinson LLP; Joseph M. Maraia

(57) ABSTRACT

The invention relates to a method for non-invasive reproducible determination of a corrected surface on a 3D bone surface model constructed from 3D medical image of a bone having a deformation consisting in a bump overgrowth at the head-neck junction; wherein said corrected surface comprises: i) a 3D spherical corrected surface patch on the head portion of said 3D bone surface model, and ii) a 3D smooth transition corrected surface patch on the neck portion of said 3D bone surface model, contiguous to said 3D spherical corrected surface patch; Said corrected surface patches are defined by a set of parameters comprising: iii) at least one first parameter (a*) representing a spherical extent value of said 3D spherical corrected surface patch, iv) and a set of at least one second parameter, said set determining the 3D correction boundary of said corrected surface patches, such (Continued)

that said corrected surface patches are continuous with said 3D bone surface model along said boundary.

21 Claims, 19 Drawing Sheets

Related U.S. Application Data

(60) Provisional application No. 61/355,207, filed on Jun. 16, 2010.

(51) Int. Cl.
    *G06T 17/30*     (2006.01)
    *G06T 19/20*     (2011.01)
    *G06T 3/60*     (2006.01)
    *G06T 5/00*     (2006.01)

(52) U.S. Cl.
    CPC ........... *G06T 19/20* (2013.01); *G06T 2210/41* (2013.01); *G06T 2219/2021* (2013.01)

(56) References Cited

U.S. PATENT DOCUMENTS

| | | | |
|---|---|---|---|
| 6,853,741 B1* | 2/2005 | Ruth et al. | 382/132 |
| 7,388,973 B2* | 6/2008 | Fidrich et al. | 382/128 |
| 7,672,709 B2 | 3/2010 | Lavallee et al. | |
| 2002/0055780 A1* | 5/2002 | Sklar | 623/13.12 |
| 2005/0143676 A1 | 6/2005 | De Guise et al. | |
| 2007/0122233 A1 | 5/2007 | Maier et al. | |
| 2007/0195933 A1 | 8/2007 | Bogojevic et al. | |
| 2007/0249967 A1* | 10/2007 | Buly et al. | 600/595 |
| 2008/0058613 A1* | 3/2008 | Lang et al. | 600/300 |
| 2008/0086150 A1 | 4/2008 | Mathis et al. | |
| 2008/0177173 A1 | 7/2008 | Deffenbaugh et al. | |
| 2008/0214960 A1 | 9/2008 | Hodgson et al. | |
| 2008/0312663 A1* | 12/2008 | Haimerl et al. | 606/130 |
| 2008/0319449 A1 | 12/2008 | Tuma et al. | |
| 2009/0017430 A1 | 1/2009 | Muller-Daniels et al. | |
| 2009/0069845 A1* | 3/2009 | Frushell et al. | 606/228 |
| 2009/0089034 A1 | 4/2009 | Penney et al. | |
| 2009/0112214 A1 | 4/2009 | Philippon et al. | |
| 2009/0285465 A1 | 11/2009 | Haimerl et al. | |
| 2010/0049493 A1 | 2/2010 | Haimerl | |
| 2011/0190774 A1* | 8/2011 | Nikolchev et al. | 606/90 |
| 2011/0286649 A1* | 11/2011 | Reisman et al. | 382/131 |
| 2014/0278322 A1* | 9/2014 | Jaramaz et al. | 703/11 |

OTHER PUBLICATIONS

Non-uniform rational B-spline [retrieved on Apr. 29, 2014] Retreived from internet <URL: http://web.archive.org/web/20091027065213/hllp://en.wikipedia.org/wiki/Non-uniform_rational_B-spline> published Oct. 27, 2009 as per Wayback Machine.
Dudda M. et al al, "Do Normal Radiographs Exclude Asphericity of the Femoral Head-Neck Junction?", Clin Orthop Relat Res (2009) 467:651-659.
Rakhra K.S. et al, "Comparison of MRI Alpha Angle Measurement Planes in Femoroacetabular Impingement", Clin Orthop Relat Res (2009) 467:660-665.
Kang et al, "Accurate simulation of hip joint range of motion", Computer Animation Conference—CA, pp. 215-219, 2002.
Brunner A. et al, "Evaluation of a Computed Tomography-Based Navigation System Prototype for Hip Arthroscopy in the Treatment of Femoroacetabular Cam Impingement", Arthroscopy: The Journal of Arthroscopic and Related Surgery, vol. 25, No. 4 (Apr.), 2009: pp. 382-391.
Arbabi E. et al, "A fast method for finding maximum range of motion in the hip joint", CAOS 2007, Heidelberg, Germany, p. 20-23.
Arbabi E. et al, "Penetration Depth Method-Novel Real-Time Strategy for Evaluating Femoroacetabular Impingement", Journal of Orthopaedic Research, vol. 28, Issue 7, pp. 880-886, Jul. 2010.
Dario P. et al, "A Novel Mechatronic Tool for Computer-Assisted Arthroscopy", IEEE Engineering in Medicine and Biology Society 2000;4(1)15-29.
Hodgson A.J. et al, "Computer-assisted femoral head resurfacing", Computer Aided Surgery, Sep./Nov. 2005; 10(5/6): 337-343.
Kendoff D. et al, "Feasibility of a navigated registration technique in FAI surgery", Archives of Orthopaedic and Trauma Surgery, vol. 131, No. 2, pp. 167-172, 2011.
Wengert C. et al, "Markerless Endoscopic Registration and Referencing", Med Image Comput Comput Assist Interv. 2006;9(Pt 1):816-23.
Monahan E. et al, "Computer-aided navigation for arthroscopic hip surgery using encoder inkages for position tracking", Int J Med Robotics Comput Assist Surg 2006; 2: 271-278.
Monahan E. et al, "A study of user performance employing a computer-aided navigation system for arthroscopic hip surgery", Int J CARS (2007) 2:245-252.
Charbonnier C. et al, "Motion study of the hip joint in extreme postures", The Visual Computer, vol. 25, No. 9, pp. 873-882, 2009.
Gilles B. et al, "MRI-based Assessment of Hip Joint Translations", J Biomech, vol. 42, Jun. 2009.
Murphy S.B. et al, "Arthroscopic percutaneous computer assisted FAI relief using a new method of CT-fluoro registration", Computer-Assisted Orthopedic Surgery-International, 2007.
Barrett A.R.W et al, "Preoperative planning and intraoperative guidance for accurate method of CT-fluoro registration", Computer-Assisted Orthopedic Surgery-International, 2007.
Puls M. et al, "Simulation of Hip Motion for Impingement Detection: A Comparison of Four Strategies", Journal of Biomechanics 41(51), 16th ESB Congress, Oral Presentations, Tuesday Jul. 8, 2008.
Cai D. et al, "Rapid Impingement Detection System with Uniform Sampling for Ball-and-Socket Joint", Workshop on 30 Physiological Human, Zermatt, Switzerland, Dec. 1-4, 2008.
Tannast M. et al, «Computer-assisted Simulation of Femoroacetabular Impingement Surgery», In JB Stiehl, WH Konermann, RG Haaker, AM DiGioia (eds.): "Navigation and MIS in Orthopaedic Surgery", Berlin, Heidelberg, New York: Springer-Verlag. pp. 448-455, 2006.
Tanna st M. et al, "Noninvasive three-dimensional assessment of femoroacetabular Impingement", Journal of Orthopedic Research, Jan. 2007.
Wu C., "30 Reconstruction and Tracking of Anatomical Structures from Endoscopic Images", Thesis, 2009.
Charbonnier C. et al, "Virtual Hip Joint: from Computer Graphics to Computer-Assisted Diagnosis", Eurographics 2009, Mar. 30-Apr. 3, Munich, Germany.
Zaragoza E.J., "30 CT and the Imaging Approach to Femoroacetabular Impingement Syndrome", Section 4, Orthopedic Imaging, TeraRecon Clinical Case Studies—vol. 1, pp. 143-150.
Kang et al., CAOS 2005 Conference Proceedings, "Computer-assisted pre-operative planning for hip joint-preserving surgery".
Fleute M et al: "Building a Complete Surface Model From Sparse Data Using Statistical Shape Models: Application to Computer Assisted Knee Surgery", Medical Image Computing and Computer-Assisted Intervention Miccai. International Conference. Proceedings XX, Oct. 1, 1998 (Oct. 1, 1998), pp. 879-887, XP000913649.
Fleute M et al: "Incorporating a Statistically Based Shape Model Into a System for Computer-Assisted Anterior Cruciate Ligament Surgery", Medical Image Analysis, Oxford University Press, Oxford, GB, vol. 3, No. 3, Sep. 1, 1999 (Sep. 1, 1999), pp. 209-222, pp. 556-560) XP008067851.
Ntitzli et al, "The Contour of the Femoral Head-Neck Junction as a Predictor for the Risk of Anterior Impingement," Journal of Bone and Joint Surgery (BR), vol. 84-B, No. 4, May 2002, pp. 556-560.
Lopes D.S., Jorge J. P., Pires E.B., Simoes F. M. F.: "A three-dimensional geometry model of a hip joint presenting a femoral head deformity based on radial magnetic resonance arthrography images", VI PI MAGE 2009—II ECCOMAS Thematic Conference on Computational Vision and Medical Image Processing, Porto, Portugal, Oct. 14, 2009 (Oct. 14, 2009), XP008158740.

(56) References Cited

OTHER PUBLICATIONS

Pise UV et al: "AB-spline based heterogeneous modeling and analysis of proximal femur with graded element", Journal of BiOmechanics, Pergamon Press, New York, NY, US, vol. 42, No. 12, Aug. 25, 2009 (Aug. 25, 2009), pp. 1981-1988, XP026446859.
International Search Report for International Application PCT/IB2011/00163, mailed Dec. 19, 2012.

* cited by examiner

Hemi-Plane $Pi_{Max}$

Hemi-Plane Pi

Hemi-Plane Pi

METHOD FOR DETERMINING BONE RESECTION ON A DEFORMED BONE SURFACE FROM FEW PARAMETERS

TECHNICAL FIELD

The invention relates to the field of computer assisted surgery, and more particularly to a method for determining bone resection on a deformed articulation surface.

BACKGROUND OF THE INVENTION

Articulations of the human body are often very complex systems and no precise generic model exists to capture all the variability from one articulation to another. It is therefore necessary to use specific medical images or collection of digital patient data in order to get relevant information to develop techniques, devices and methods that will facilitate a treatment or a diagnosis.

In a specific example related to the hip articulation, structural abnormalities in the morphology of the hip can limit motion and result in repetitive impact of the proximal femoral neck against the acetabular labrum and its adjacent cartilage. Femoro Acetabular Impingement (FAI) is a pathology that can result from a decreased femoral head-neck offset (cam effect), an overgrowth of the bony acetabulum (pincer effect), excessive acetabular retroversion or excessive femoral anteversion, or a combination of these deformities. The cam impingement is generally characterized by a bone overgrowth located at the antero-superior aspect of the femur head-neck junction, which destructures the spherical shape of the femur head. The pincer impingement is generally characterized by an overcoverage located at the anterior aspect of the acetabulum rim. However, the correct and full diagnosis of this pathology is not easy to determine, especially when dealing with subtle deformities. Standard radiographic X-rays are used for the initial diagnosis and then three dimensional (3D) Computed Tomography (CT) scans or Magnetic Resonance Imaging (MRI) exams are generally performed in case of suspected FAI pathology. The processing of the 3D images remains a laborious manual task which cannot ensure accuracy and reproducibility, potentially misleading the diagnosis or the surgical indication. Moreover, even though 3D information can be extracted from such exams, the reconstructed bone volumes remain static and cannot predict with reliability the exact location of the impingement which occurs during the mobilization of the hip.

The surgical treatment of FAI aims at restoring a normal spherical shape to the femur head neck junction at the level of the bony cam lesion and restoring a normal coverage rate of the acetabular rim at the level of the pincer lesion, by removing the excess of bone. The result of this bony reshaping is the restoration of a greater range of motion of the hip, without impingement. Conventionally, the open surgical approach had initially been adopted since it provides a full exposure of the bone and direct access to the anatomy to be treated. Though, since minimally invasive procedures have grown in popularity by reducing the pain, morbidity and recovery time for patient, arthroscopic treatment of FAI has been explored in the last decade, which requires the use of an endoscopic camera and specific small instruments that can pass through various types of canulas. Advantages include minimally invasive access to the hip joint, peripheral compartments, and associated soft tissues. Furthermore, arthroscopy allows for a dynamic, intra-operative assessment and correction of the offending lesions.

However, due to the depth of the joint and the reduced visibility and access, theses hip arthroscopy procedures are difficult to perform and not all surgeons feel comfortable about adopting the technique. The success of such arthroscopic interventions relies on correct diagnosis, accurate pre-operative assessment of the pathology, very meticulous intra-operative evaluation and a thorough and accurate correction of impingement lesions on both the femoral and acetabular sides, which can only be accomplished after a laborious learning curve over many cases. Failure of arthroscopic procedures for FAI is most commonly associated with incomplete decompression of the bony lesions.

Hence, one important issue is the difficulty to determine precisely and in a reproducible manner the location and amount of bone to be resected on a deformed articulation bone surface in order to recreate a smooth bone surface. The surgeons are generally applying 2D templates over the patient X-ray images to try to estimate the resection to be achieved. This remains a very limited and inaccurate method for addressing a problem in 3D space. The acquisition of a pre-operative 3D image of the patient is becoming a common protocol in these pathologies, thus increasing the level of information of the surgeon on the pathological problem. However, there are very few tools to process these 3D images and use resulting information in order to provide a proposition for the bone correction to be performed. Most of the imaging systems used to acquire the 3D images provide 3D reconstruction of bone surface models, however, the processing have to be applied manually and the results are only static projection views of the bone models. There exists some software proposing to simulate the resection pre-operatively, like the Mimics® software from Materialise, Leuven, Belgium, but the tools they offer are only simulation of bone milling process to be applied manually by the user, point by point, which takes a lot of time to perform, and does not guarantee reproducible results based on objective criteria. Another method consists in using the opposite side of the patient and mirror the opposite surface to define an optimal correction surface on the deformed side, but accurate results cannot be provided if the opposite side has also some early stage of deformity.

The characterization of the bone deformation by a so-called "alpha angle" measured on slice of the 3D image passing by the neck axis and quantifying the bump deformation on the head neck junction by a deviation measure from an ideal sphere has been described by Nötzli et al (2002). Some methods have been developed to determine the resection to be applied to correct the deformation by removing the excess of bone which deviates from the ideal sphere (Kang et al, 2005 and Tannast et al, 2006).

However a precise parameterization of the boundary of the targeted correction and the shape of the corrected bone surface has not been provided yet. One difficulty is to minimize the number of parameters defining such correction while ensuring to provide a valid correction covering individual specificities of the deformation.

In particular, obtaining a smooth transition and a minimal indentation for the new shape of the bone after correction has been formulated by several authors as reasonable and obvious criteria, but no method for efficient routine use has been proposed.

SUMMARY OF THE INVENTION

The invention provides a method for non-invasive reproducible determination of a corrected surface on a 3D bone surface model constructed from 3D medical image of a bone having a deformation; the bone comprising a head portion contiguous to a neck portion, and the bone deformation consisting in a bump overgrowth at the head-neck junction; wherein said corrected surface comprises:
i) a 3D spherical corrected surface patch on the head portion of said 3D bone surface model, and
ii) a 3D smooth transition corrected surface patch on the neck portion of said 3D bone surface model, contiguous to said 3D spherical corrected surface patch; and wherein said corrected surface patches are defined by a set of parameters comprising:
iii) at least one first parameter ($\alpha^*$) representing a spherical extent value of said 3D spherical corrected surface patch,
iv) and a set of at least one second parameter in addition to said first parameter, said set determining the 3D correction boundary of said corrected surface patches, such that said corrected surface patches are continuous with said 3D bone surface model along said boundary, and such that the surface tangents to said corrected surface patches along said boundary are continuous with the surface tangents to said 3D bone surface model outside said boundary.

Said set of parameters may advantageously consist consists of said first parameter and one second parameter.

According to an embodiment, the method further comprises steps for the determination from said 3D bone surface model of geometrical elements characterizing the anatomy of the bone, said geometrical elements including a sphere fitted to the spherical portion of head and a neck axis, and wherein said first parameter ($\alpha^*$) is a target angle, expected to be achieved after surgery, measured radially between the hemi-line issued from the center of the fitted sphere and orientated distally along the neck axis, and a radius of the fitted sphere, and said at least second parameter defines the extent on the 3D bone surface model of said 3D correction boundary.

The method may further comprise the following steps:
i) determining from said 3D bone surface model and from said geometrical elements characterizing the anatomy of the bone, a clock face referential on the head portion of the bone rotating around the neck axis;
ii) determining a 3D head-neck junction curve on the 3D bone surface model characterizing the head-neck junction of the bone around the clock face referential; and
iii) determining from said 3D head-neck junction curve a summit point characterizing the maximum of the bump deformation; said summit point being the point of said 3D head-neck junction curve closest to the apex point of the spherical portion of the head of the bone;
and wherein the 3D correction boundary proximally extends up to said summit point.

Besides the method may further comprise the following steps:
i) determining the parallel of latitude $\alpha^*$ of the fitted sphere;
ii) determining two radial hemi-planes containing the neck axis and passing respectively at the intersection of said parallel of latitude $\alpha^*$ and the 3D head-neck junction curve; the clock indices of these two hemi-planes on said clock face referential determining a correction clock interval;
iii) determining on the 3D bone surface model a closed contour around said summit point of the 3D head-neck junction curve, which contour extends at least distally to the parallel of latitude $\alpha^*$, and covers at least radially the correction clock interval, said closed contour being the 3D correction boundary;

According to an embodiment of the invention, the closed contour on the 3D bone surface model defining the 3D correction boundary consists of the intersection of the 3D bone surface model with a 3D boundary box, said 3D boundary box being a geometrical 3D construction defined from at least the second parameter.

In particular, said 3D boundary box may be a polyhedron.

According to an embodiment, said polyhedron is a geometrical construction delimited by the following four limits:
i) a proximal limit defined by a portion of the intersection of the 3D bone surface model with a plane orthogonal to the neck axis and passing through the summit point of the 3D head-neck junction curve included in the correction interval;
ii) two radial limits defined by the two bone contours defined respectively as the intersection of the 3D bone surface model by the two hemi-planes determining the correction clock interval;
iii) a distal limit defined by a 3D neck curve defined as the intersection of the 3D surface model by a plane orthogonal to the neck axis; the coordinate position along the neck axis defining a proximal point being the at least second parameter and which is located further down in the neck direction at a distance of at least the fitted sphere radius from the fitted sphere center;
the 3D correction boundary being fully determined from the couple of parameters ($\alpha^*$, proximal point).

According to an er embodiment, said set of at least one second parameter includes two adjustable clock indices controlling the extent of the correction clock interval; wherein the two radial hemi-planes corresponding to these two indices produce new intersection contours with the 3D surface model, the radial limits of the 3D correction boundary being constituted by said new intersection contours; the 3D correction boundary being fully determined from the quartet of parameters ($\alpha^*$, proximal point, first clock index, second clock index).

According to another embodiment, said set of at least one second parameter includes an adjustable distal point on the neck axis determining a distal adjustable plane orthogonal to the neck axis and intersecting the 3D surface model on the distal portion of the femoral neck, thus producing a new distal limit; the adjustable distal point being positioned between the coordinate on the neck axis of the plane passing through the parallel of latitude $\alpha^*$ and a predefined max distal coordinate on the neck axis; the 3D correction boundary being fully determined from the triplet of parameters ($\alpha^*$, proximal point, distal point).

According to another embodiment, said set of at least one second parameter includes any of the set of adjustable parameters as described above; which combination controls the extent of the 3D correction boundary; the 3D correction boundary being fully determined from the set of 5 parameters being ($\alpha^*$, proximal point, distal point, clock index 1, clock index 2).

The 3D boundary box may be a cylinder constructed by the following steps:
i) determining a summit radial hemi-plane passing through the neck axis and said summit point of the 3D head-neck junction curve;
ii) determining a radius line of the fitted sphere passing at the intersection of said summit radial hemi-plane and the parallel of latitude $\alpha^*$;
iii) positioning the cylinder so that its long axis is along the defined radius line;
iv) determining the diameter of the cylinder so that the intersection curve of the external wall of the cylinder with the 3D surface model extends to cover the clock interval and the summit point.

Said set of at least one second parameter may include an adjustable axis vector, an adjustable axis issue point and an adjustable cylinder radius which determine respectively the orientation, position and size of said cylinder; said axis vector being adjustable from the initial radius line rotating around the center of the fitted sphere and with a predefined 3D angle variation; said axis issue point being adjustable along the neck axis in an interval between the center of the fitted sphere and the coordinate point on the neck axis of the orthogonal plane passing through the parallel of latitude $\alpha^*$; the 3D correction boundary being fully determined from the quartet of parameters ($\alpha^*$, axis vector, axis issue point, cylinder radius).

According to another embodiment, the 3D boundary box is a cone constructed by the following steps:
i) determining a summit radial hemi-plane passing through the neck axis and said summit point of the 3D head-neck junction curve;
ii) determining a radius line of the fitted sphere passing at the intersection of said radial hemi-plane and the parallel of latitude $\alpha^*$;
iii) positioning the cone so that its rotational axis is along said radius line and issued from the center of the fitted sphere;
iv) determining the aperture angle of the cone so that the intersection curve of the external wall of the cone with the 3D surface model extends to cover the clock interval and the summit point.

Said set of at least one second parameter may include an adjustable axis vector, an adjustable axis issue point and an adjustable aperture angle which determine respectively the orientation, position and aperture of the cone; said axis vector being adjustable from the initial radius line rotating around the center of the fitted sphere and with a predefined 3D angle variation; said axis issue point being adjustable along the neck axis in an interval between the center of the fitted sphere and the coordinate point on the neck axis of the orthogonal plane passing through the parallel of latitude $\alpha^*$; the 3D correction boundary being fully determined from the quartet of parameters ($\alpha^*$, axis vector, axis issue point, aperture angle).

The determination of the 3D spherical corrected surface patch and the 3D smooth transition corrected surface patch within the 3D correction boundary comprises the steps of:
i) splitting the 3D correction boundary in two contiguous regions by the parallel of latitude $\alpha^*$, one distal region on the neck side and one proximal region on the head side, a portion of the parallel of latitude $\alpha^*$ forming a common boundary between said two contiguous regions;
ii) determining the 3D spherical corrected surface patch inside the proximal region as a pure spherical portion of the fitted sphere;
iii) determining the 3D smooth transition corrected surface patch inside the distal region by a 3D transition surface spline, said 3D transition surface spline being continuous with the 3D spherical corrected surface patch inside the proximal region along the common boundary, and continuous with the 3D bone surface model along its other boundary;
the union of the 3D spherical corrected surface patch and the 3D smooth transition corrected surface patch constituting a 3D corrected surface inside the 3D correction boundary.

Advantageously, the surface tangents of said 3D transition surface spline are continuous with the surface tangents of the 3D spherical corrected surface patch along the common boundary, and the surface tangents of said 3D transition surface spline are continuous with the surface tangents of the 3D bone surface model along its other boundary.

The 3D spherical corrected surface patch may further be determined by a 3D spherical surface spline, said 3D spherical surface spline being continuous with the 3D smooth transition corrected surface patch along the common boundary and continuous with the 3D bone surface model along its other boundary, and wherein the surface tangents of the 3D spherical corrected surface patch are the tangents of the fitted sphere along the common boundary and the surface tangents of the 3D spherical corrected surface patch are continuous with the tangents of the 3D bone surface model along its other boundary.

The surface tangents of said 3D transition surface spline along the common boundary may further be adjustable by a radial vector field controlling the surface tangents of said 3D transition spline surface along the common boundary to adjust the curvature at the junction of 3D spherical corrected surface patch and the 3D smooth transition corrected surface patch; all vectors of said radial vector field being issued from regular points located on the common boundary and being orientated towards a point on the neck axis located in the interval from the center of the fitted sphere to a predefined maximum distal point on the neck axis; the adjustable orientation of the vector field towards the center of the femoral head resulting in the emergence of a sharp edge in said 3D corrected surface patch, along the common boundary.

The length of the radial vector field can also be adjusted to control the height of said emerging sharp edge.

The boundary of the distal region may be composed of the two following portions:
i) the common boundary, and
ii) an external distal boundary being the boundary of the distal region minus the common boundary;
wherein the 3D transition surface spline is constructed from surface interpolation between a set of radial 3D Bezier curves of degree at least 3, located at regular clock intervals on the clock correction interval.

Each of the radial 3D Bezier curve may be determined by a distal extremity control point located on the 3D bone surface model along the external distal boundary, and a proximal extremity control point located on the fitted sphere along the common boundary.

Each of the radial 3D Bezier curve slope may be determined by a distal slope control point located on the 3D bone surface model, shifted proximally by a predetermined coefficient in the direction of the neck axis from the distal extremity control point, and by a proximal slope control point located at the end point of the radial vector of the corresponding radial index.

DESCRIPTION OF THE DRAWINGS

Further aims, features and advantages of the invention will appear in the following detailed description with reference to illustrative and non limitative drawings, among which:

FIG. 8 is a perspective view of the proximal femur showing the determination of the spherical correction on the head portion and a smooth junction correction on the neck within a correction boundary.

DETAILED DESCRIPTION OF THE INVENTION

The method described hereafter provides a precise and reproducible process to determine from 3D medical image of the bone, a correction of a bone deformation at the head-neck junction of the bone, with a limited number of parameters, enabling an individual adjustment of the correction boundary and corrected shape.

In reference to the drawings, a method for non-invasive determination of parameters defining a boundary and a corrected surface from a resection of a deformed surface of a bone is hereafter described. The resection of a deformed surface of the bone is used for correction of an articulation condition.

In the following description, the method is described with reference to the hip articulation. Thus, the method will be used for defining a resection of a bump overgrowth deformed surface on the femur head neck junction. However, the invention is not limited to the application to the femur but can be used for defining a resection of a deformed surface of any articulation bone comprising a head and a neck. The person skilled in the art will easily adapt the method of the invention to such articulation bones.

Figure 1:
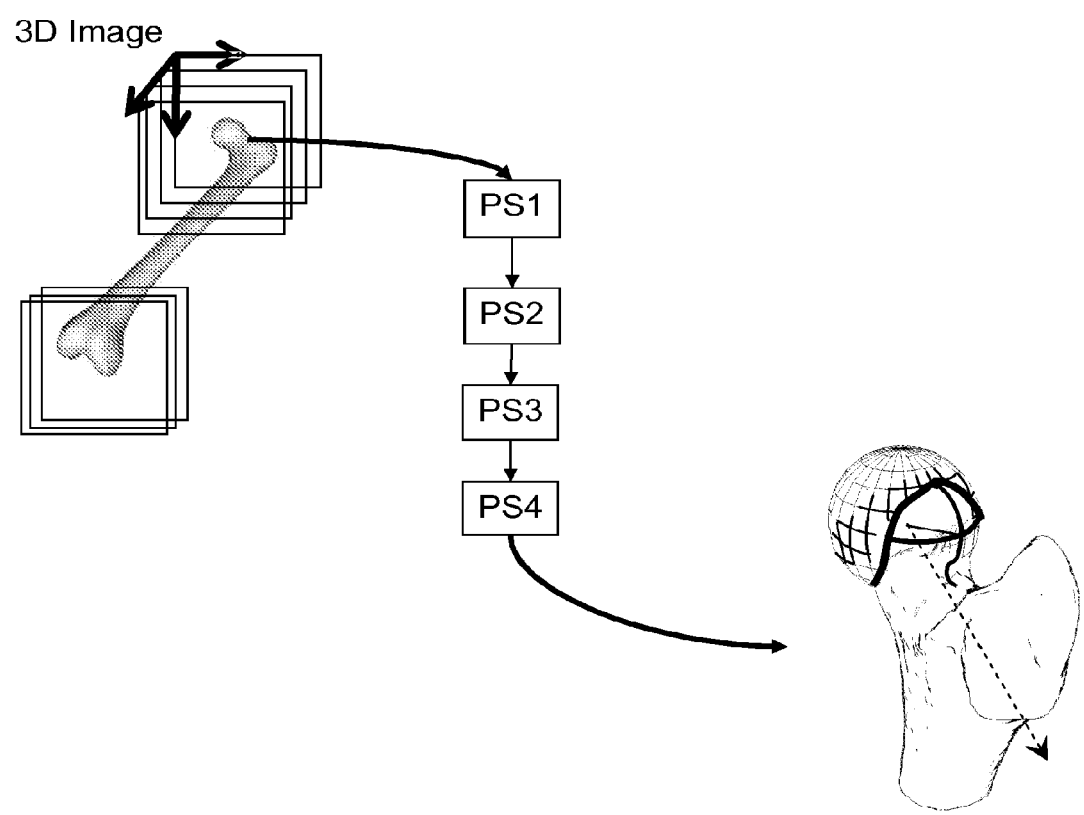
FIG. 1 is a representation of the different steps being carried in the method, illustrating the initial input and the final output.

As shown in FIG. 1, the method requires a 3D image examination of the patient acquired using a specific pre-defined protocol. For example, 2D images of the hip can be acquired to construct the 3D image by computer tomography (CT): the 2D images are parallel one with the other and are stacked, creating the 3D image. In addition to the conventional 3D image acquisition protocol for the hip, few extra CT images at the level of the knee are also acquired.

Figure 2A:
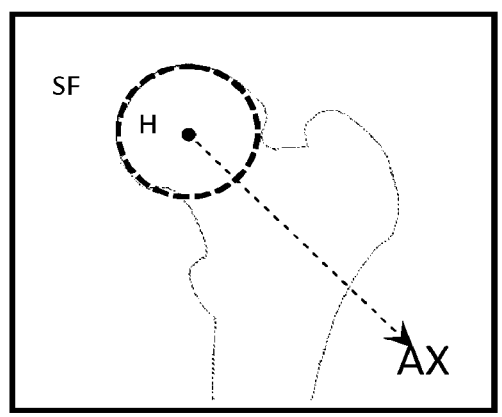
FIG. 2A shows two orthogonal 2D images extracted from the 3D image, in axial and coronal direction, commonly used to determine manually the position the femoral head sphere and the neck axis.
Figure 2A:
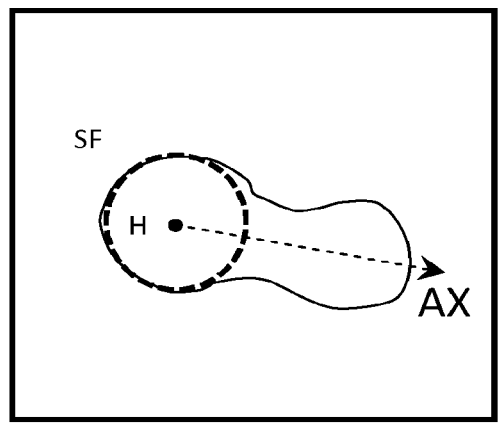

In a first preliminary step PS1 the 3D image of the hip is processed for extracting critical geometrical elements characterizing the femur. These geometrical elements can be determined interactively by the user using standard orthogonal 2D images extracted from the 3D image as illustrated in FIG. 2A, such orthogonal 2D images being determined by sliding along an axial direction and a frontal direction in the 3D image volume to select the images showing the best view of the searched geometrical elements. In the present example, the required geometrical elements are a femoral head sphere SF fitting the non-deformed part of the femoral head, a femoral head center point H, center of the sphere SF, a femoral neck axis AX, and a knee center point K.

As illustrated in FIG. 2A, the sphere SF is determined by placing interactively a circle on the femur head contours in at least two orthogonal 2D images extracted from the 3D image in axial and coronal directions. The size and position of the femoral head sphere SF is interactively adjusted, which results in the determination of the 3D femoral head sphere SF. The femoral head center H is then determined as the center of the femoral head sphere SF. The neck axis AX is determined by interactively placing a vector line passing through the middle of the femur neck axis in the orthogonal 2D images. The knee center K is determined by interactively placing a point in the most distal 2D images extracted from the 3D image corresponding to the center of the knee.

Figure 3:
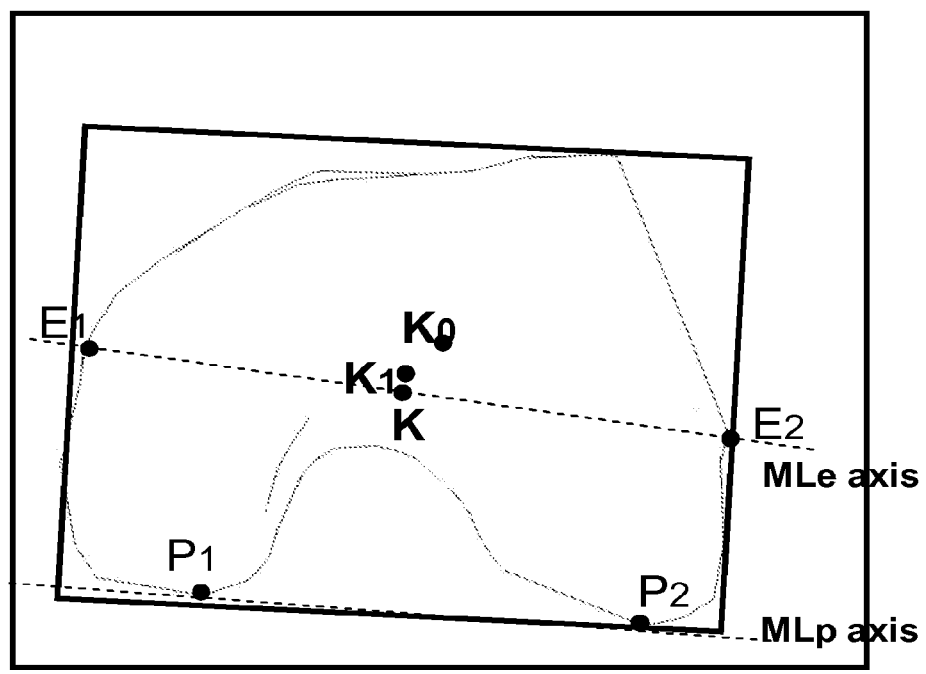
FIG. 3 is a 2D image extracted from the 3D image at the level of the knee, commonly used to determine the knee center point.

In a variant embodiment illustrated in FIG. 3B, the knee center K is determined by placing interactively two points E1 and E2 corresponding to the epicondyles defined as the most lateral and most medial points of the knee. The knee center K is then determined as the middle of the segment [E1E2].

Figure 2B:
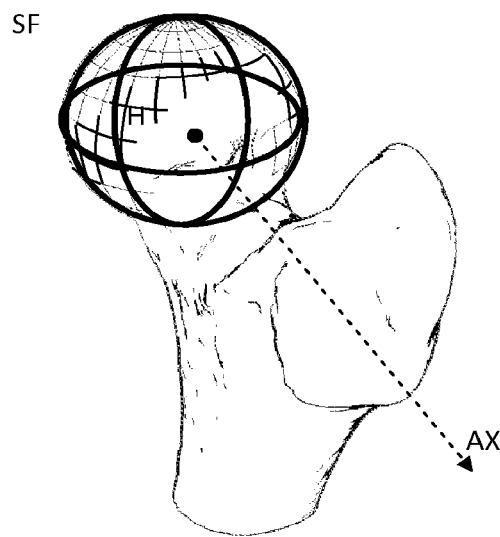
FIG. 2B shows a perspective view of a reconstructed 3D surface model of the bone, with a sphere fitted to the head portion and a neck axis.

In a second preliminary step PS2, a 3D bone surface model of the deformed bone surface is constructed from the 3D image as illustrated in FIG. 2B. In the case of CT image, step PS2 is commonly carried out with a thresholding process. Additional processing using well known mathematical morphology operators is applied to eliminate small connected components, such as erosion and dilation, and to fill the inside of surfaces so that only external surfaces of the bone remain. The femoral head sphere SF, the femoral head center H and the neck axis AX can then be represented on the 3D bone surface model.

In further description, the anatomical directions are defined as follows:
 [a] superior-inferior direction is orientated vertically from the head center H to the knee center K;
 [b] and proximal-distal direction is orientated along the neck axis, from the head center H down towards the neck.

Figure 4A:
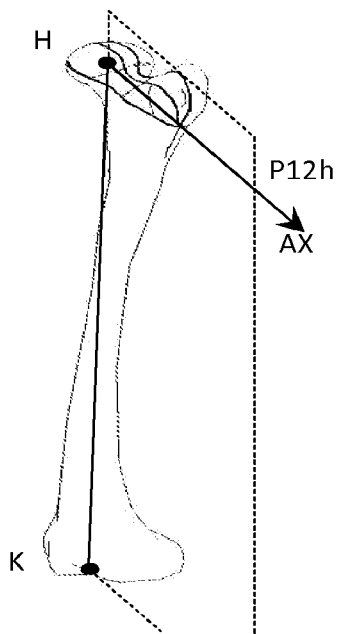
FIGS. 4A and 4B show perspective views of the femur illustrating the determination of the clock face referential on the femoral head.
Figure 4B:
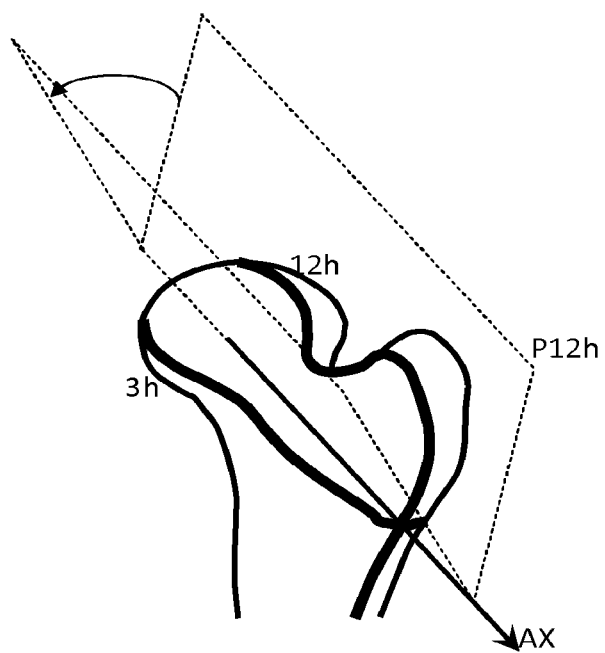

In a third preliminary step PS3, a clock face referential on the femur head, around the neck axis AX is determined. The clock face is a radial referential system representing twelve hour angular segments rotating around the neck axis AX, commonly used by surgeons to identify location of points on the bone head surface. The clock face is entirely defined by determination of a 12 o'clock position 12 h. This 12 o'clock position 12 h is determined from a plane P12 h passing through the neck axis AX and the knee center point K as shown in FIG. 4A. The 12 o'clock position 12 h is defined by the hemi-plane P12 h that is the superior half of the plane P12 h farthest from the knee, the other inferior half of the plane P defining the location of a 6 o'clock position 6 h. Successive rotations of 30° of this hemi-plane P12 h around the neck axis AX in the anterior direction will then define a 1 o'clock position, 2 o'clock position, 3 o'clock position, and so on until full quadrant is determined. FIG. 4B illustrates this construction. In a similar manner, successive rotations of 15° will define half-hour clock positions. Still in a similar manner, successive rotations of 7.5° will define quarter-hour clock positions. Further precision on the clock face is not sought for since further precision is irrelevant for the practitioner who cannot be as precise. However, in case the surgery is automated, further precision can be helpful and the clock face is further divided into five-minute clock positions or even 1-minute clock positions. The clock face thus partitioned determines a clock face referential.

Figure 5:
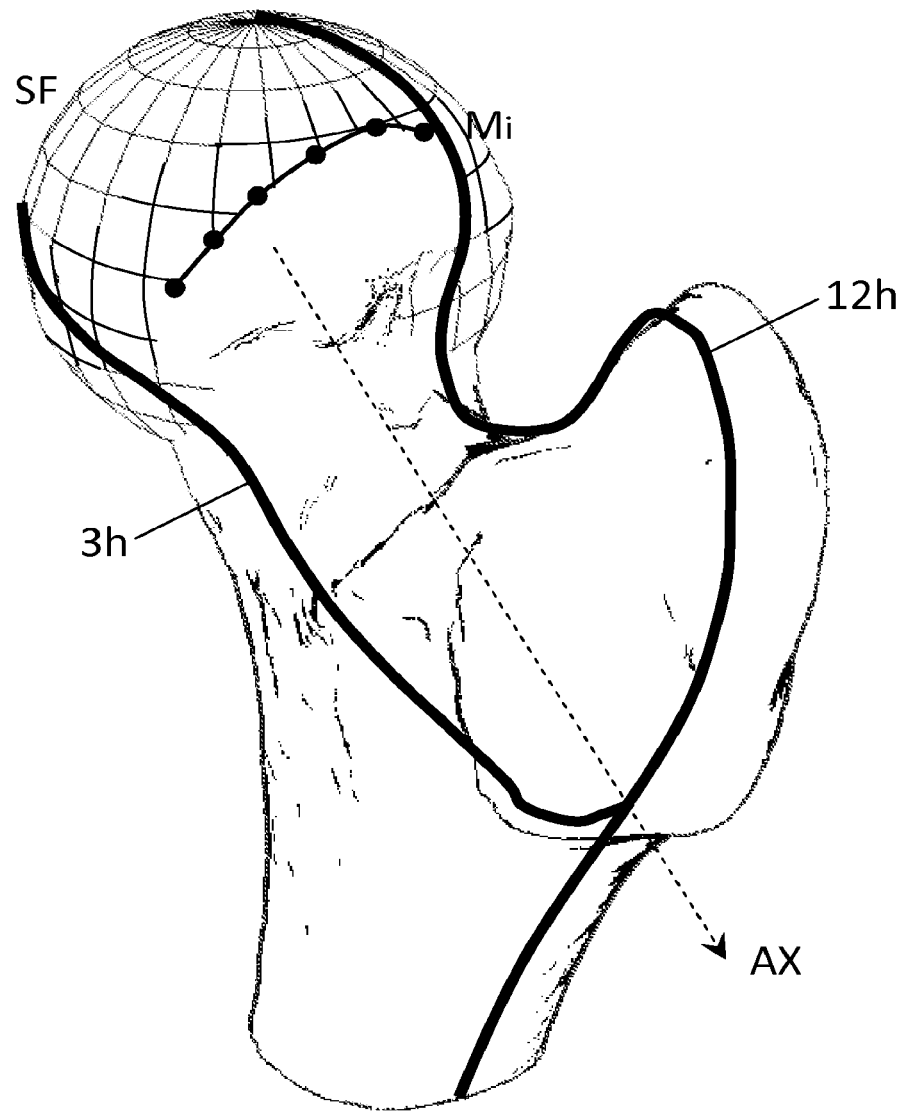
FIG. 5 is a perspective view of the proximal femur showing the 3D head-neck junction curve at the intersection of the femoral head surface and the femoral head sphere model.
Figure 6:
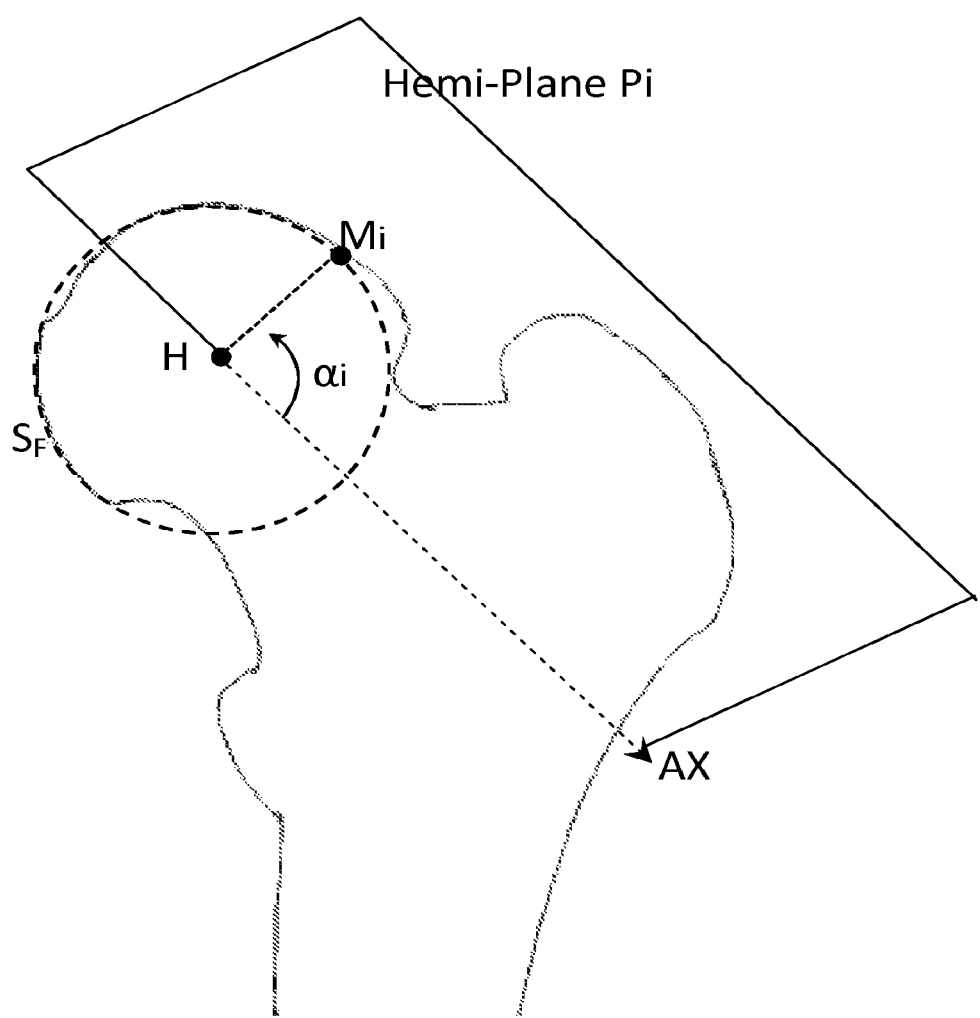
FIG. 6 shows a cross-sectional view of the proximal femur along the femoral neck axis illustrating the determination of the femur surface points composing the 3D head-neck junction curve.

Once the clock face has been determined on the femur, the location and extent of the deformed bone overgrowth is determined by overlaying the femoral head sphere SF, centered on the femoral head center H, on the 3D bone surface model in a forth preliminary step PS4. The overlay can be implemented using transparency effects, color maps of distances, or simply wire mesh for one of the femoral head sphere SF or 3D bone surface model and facets mesh for the other. The intersection of the sphere SF and the 3D bone surface model determines a 3D head-neck junction curve showing the extent of the deformed bone overgrowth area. As illustrated in FIG. 5, this 3D head-neck junction curve can be approximated by linking a succession of points Mi, each points Mi being defined within a radial hemi-plane of the clock face and indexed by a clock index i in the clock face referential and. As shown in FIG. 6, each Mi point is determined in the radial hemi-plane Pi of clock index i, such that it characterizes the location of the deviation of the bone surface from the sphere SF, thus determining an angle alpha $\alpha i$ measured as the angle between the neck axis AX and the radius (HMi).

As the 3D surface model may present some micro-local deformations which are not intented to be taken into account in the resection of the deformed surface, the points Mi are determined as the bone surface points located just above the surface of the sphere SF, beyond a given threshold TD.

Figure 7:
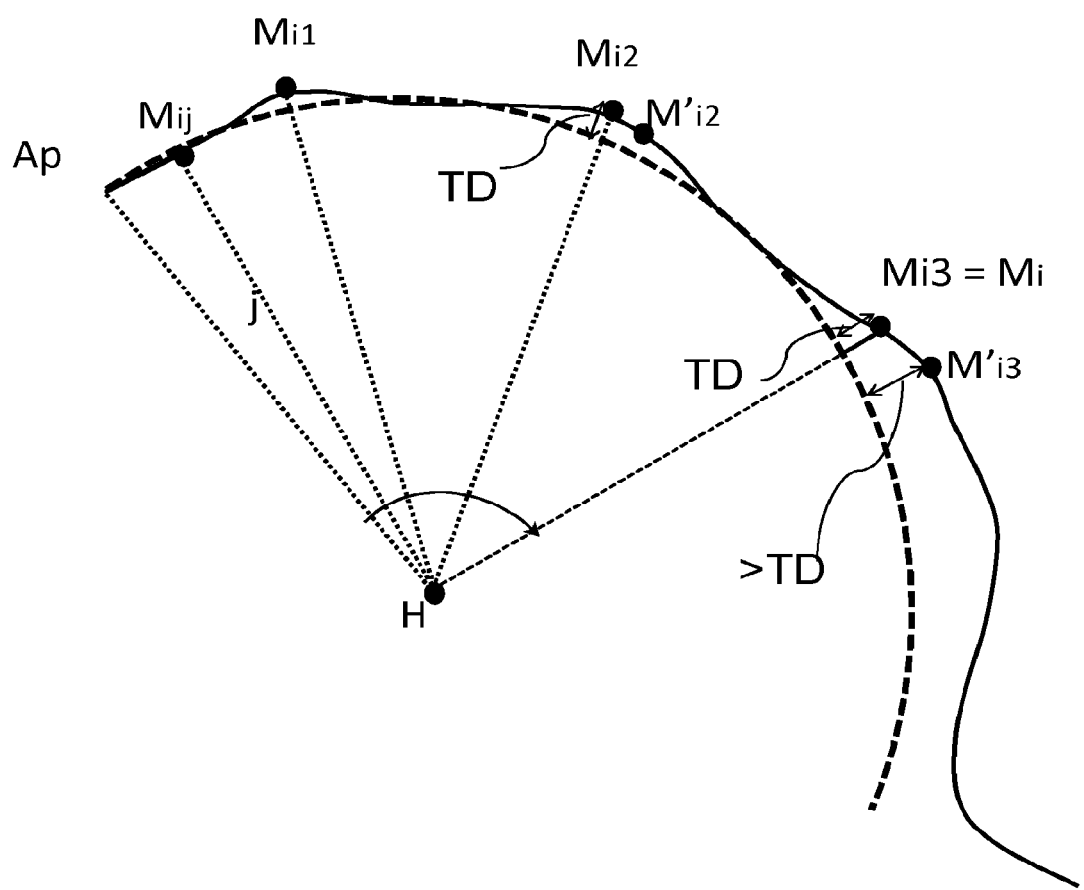
FIG. 7 shows a zoomed cross-sectional view of the proximal femur illustrating the selection in a radial hemi-plane of the point where the bone surface first deviates from the femoral sphere, within a predefined threshold distance.
Figure 8:
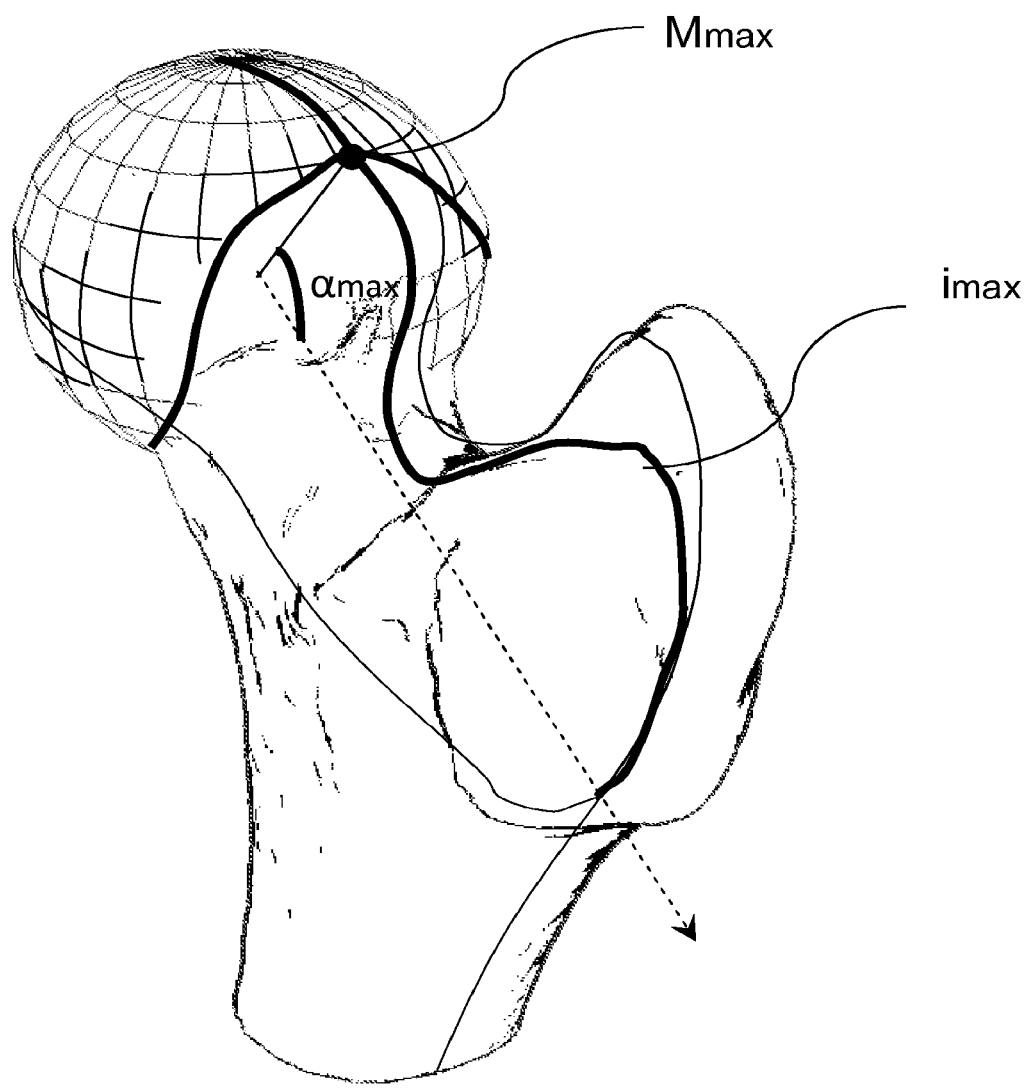
FIG. 8 shows a perspective view of the proximal femur illustrating the characterization of the summit of the bump deformation on the 3D head-neck junction curve by a clock index and a max alpha angle.

The zoomed view of FIG. 7 illustrates the selection of a point Mi amongst a plurality of candidate points Mij (j being an integer of an index position of an angle between 0° and 180°) in the same hemi-plane Pi, the distances between a candidate points Mij and the femoral head sphere SF surface is determined in the direction of the radius HMij. The candidate points Mi1, Mi2, from which the 3D surface model extends outside the femoral head sphere SF but only beneath the given threshold TD are discarded. The candidate point Mi3, from which the 3D surface model extends outside the femoral head sphere SF beyond the given threshold TD is selected. The value of the threshold TD is arbitrarily fixed depending on the noise of segmentation process. The value of the threshold TD is typically 0.5 mm or 1 mm. The 3D curve created by the selected points Mi defines the limit from which the femoral head loses its sphericity and where the deformed bone overgrowth starts. Each point Mi is associated with its corresponding hemi-plane Pi passing through the neck axis AX and the point Mi, and its clock index i. Then, as illustrated in FIG. 8 the point Mmax for which the alpha angle $\alpha$max is greatest is determined, the clock index iMax of which is also registered. The point Mmax defining the summit of the deformed bone surface on the 3D head-junction curve.

The resection of the deformed bone surface can then be determined from a main criterion which is to decrease the value of a max to a target alpha angle $\alpha^*$, by simulating the resection of the deformed bone overgrowth. This determines a corrected bone surface that will increase the spherical portion of the femoral surface and creates a smooth transition surface to non-corrected areas in the direction of the neck.

In a preferred embodiment, a first parameter is the correction target alpha angle $\alpha^*$, that is expected to be obtained post-operatively, after the bone correction. It represents the degree of sphericity that the corrected femoral head should have.

Figure 9A:
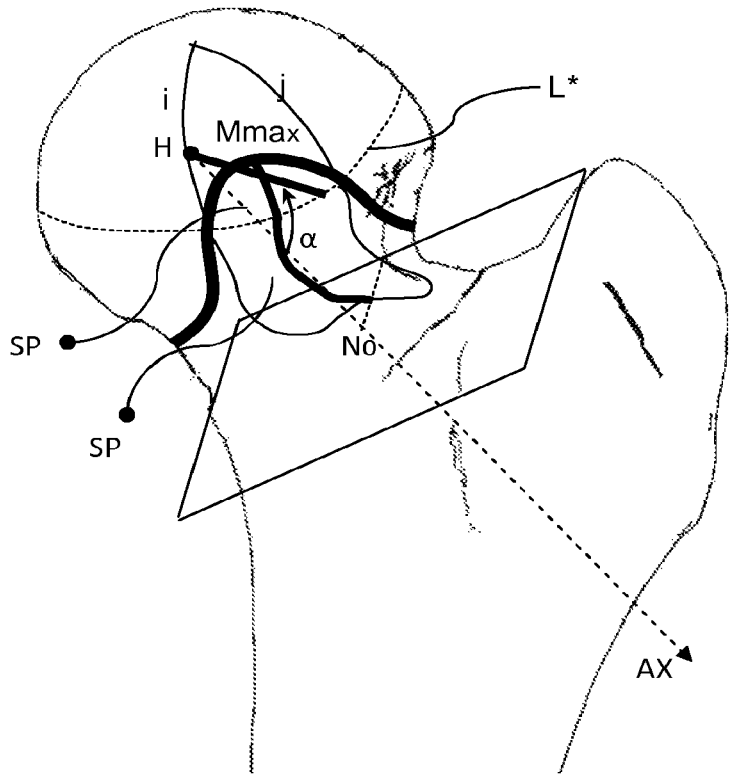
FIG. 9A is a perspective view of the proximal femur showing the determination of a parallel of latitude of desired angle, proximal to which the corrected surface is a spherical portion surface and distal to which the corrected surface is a smooth transition to the neck portion.
Figure 9B:
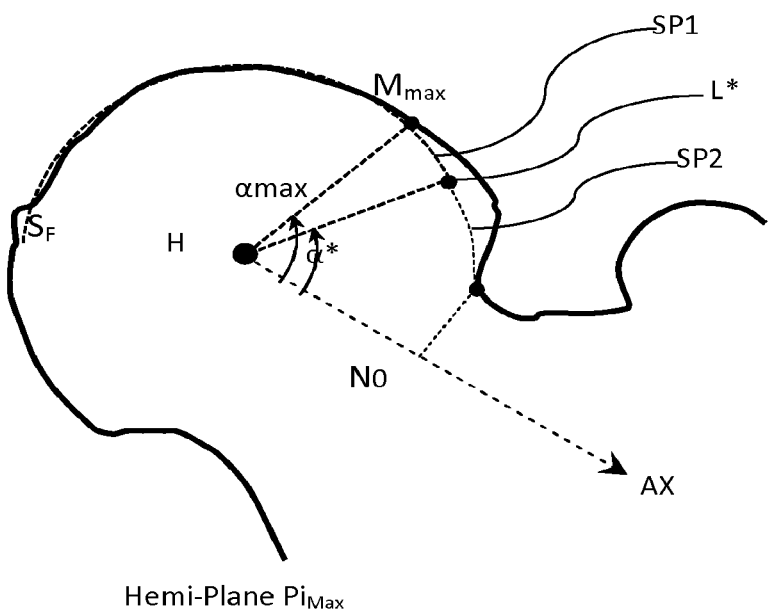
FIG. 9B is a zoomed cross-sectional radial view of the proximal femur showing the determination of the spherical correction on the head portion and a smooth junction correction on the neck within a correction boundary.

As illustrated in FIGS. 9A and 9B, this parameter $\alpha^*$ defines a parallel L* of latitude $\alpha^*$ on the surface of the sphere SF, $\alpha^*$ being the angle measured between the neck axis and any radius line issued from the center H of the sphere SF passing by the parallel L*. The corrected surface on the proximal side, closest to the head, of the parallel L* is then determined as a pure spherical surface portion SP1 of the sphere SF, extending proximally at least to the summit Mmax and radially at least to two clock indices i and j corresponding to most distant clock positions on each side of Mmax for which the respectively measured angles $\alpha i$ and $\alpha j$ are equal to $\alpha^*$, and which distal border is defined by the parallel L*, SP1 determining a 3D spherical corrected surface patch.

Apart from restoring sphericity to the femoral head, the invention also intends to provide a smooth transition corrected surface between the 3D spherical corrected surface patch and the non-corrected surface of the neck portion. By "smooth transition" is meant that the corrected surface is extended from the border of the parallel L* in the direction of the neck in order to provide a corrected surface flush to the non-corrected 3D bone surface model without sharp edges and restoring the curvature of the neck. From all the curves and surfaces defined so far, it is possible to use a conventional Computer Aided Design software package like Pro-Engineer or SolidWorks to build interactively spline patches in order to generate the 3D smooth transition corrected surface. This will implement the requirement of having a smooth transition and a minimal indentation for the new shape of the bone after correction, which has been formulated by several authors as reasonable and obvious criteria. However, this cannot be accomplished easily, it requires specialized technical skills and a lot of time. A challenge of the invention is to provide a method to generate such spline patches automatically from just a set of a few parameters that can be adjusted manually or defined automatically as well. A related difficulty is to maintain a reasonable meaning associated to such parameters for a user that has no technical expertise such as a surgeon.

As illustrated in FIGS. 9A and 9B, the distal extent of the smooth transition corrected surface is determined by a second parameter N0 which is a coordinate position on the neck axis AX defining a plane orthogonal to the neck axis AX and creating a limit between the smooth transition corrected surface and the non-corrected 3D bone surface model. The position N0 is determined arbitrarily from empirical knowledge of the anatomy, as for example to be at a distance of twice the radius of the sphere SF from the center H. Such smooth transition corrected surface is provided by a 3D smooth transition corrected surface patch SP2 that is continuous to the 3D spherical corrected surface patch SP1 and flush to the non-corrected 3D bone surface model of the neck portion.

In order to fully determine the surface patches SP1 and SP2, the invention also provides methods to determine the boundary in which the correction is applied as described hereafter.

Figure 10A:
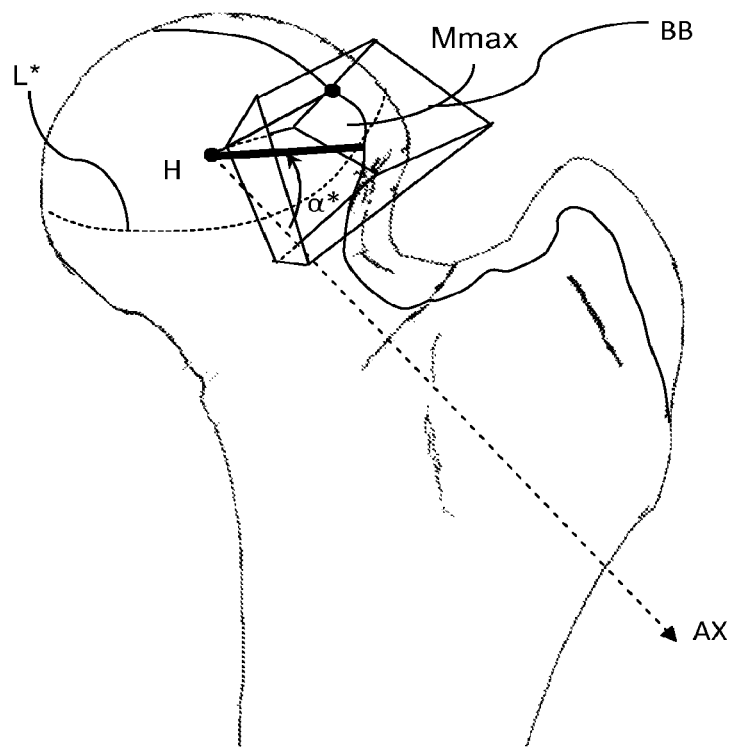
FIG. 10A is a perspective view of the proximal femur showing the definition of a boundary box to determine the limits of the corrected surface.
Figure 10B:
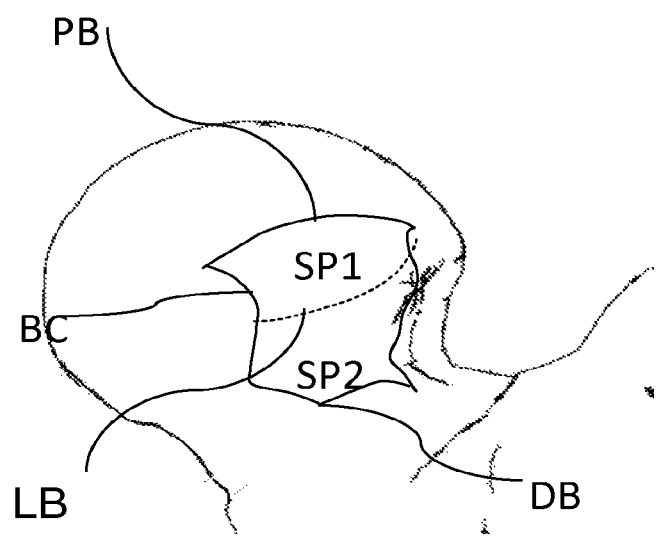
FIG. 10B is a zoomed perspective view of the proximal femur showing the boundary curve resulting from the determination of the boundary box.

As illustrated in FIG. 10A and FIG. 10B, in a preferred embodiment, a 3D boundary box BB intersects the femur head neck junction surface, thus defining a 3D boundary curve BC on the 3D bone surface model. The 3D boundary curve BC is split into two by the parallel L*, determining one proximal boundary PB which defines the limit of the 3D spherical corrected surface patch SP1, and one distal boundary DB which defines the limit of the 3D smooth transition corrected surface patch SP2, the boundaries PB and DB having a common portion LB supported by the parallel L*, their respective other boundary being the portion of respectively PB and DB without the portion LB. One intent of the invention is to provide parameters defining a construction of a 3D boundary box determining the proximal boundary PB and the distal boundary DB.

Figure 11:
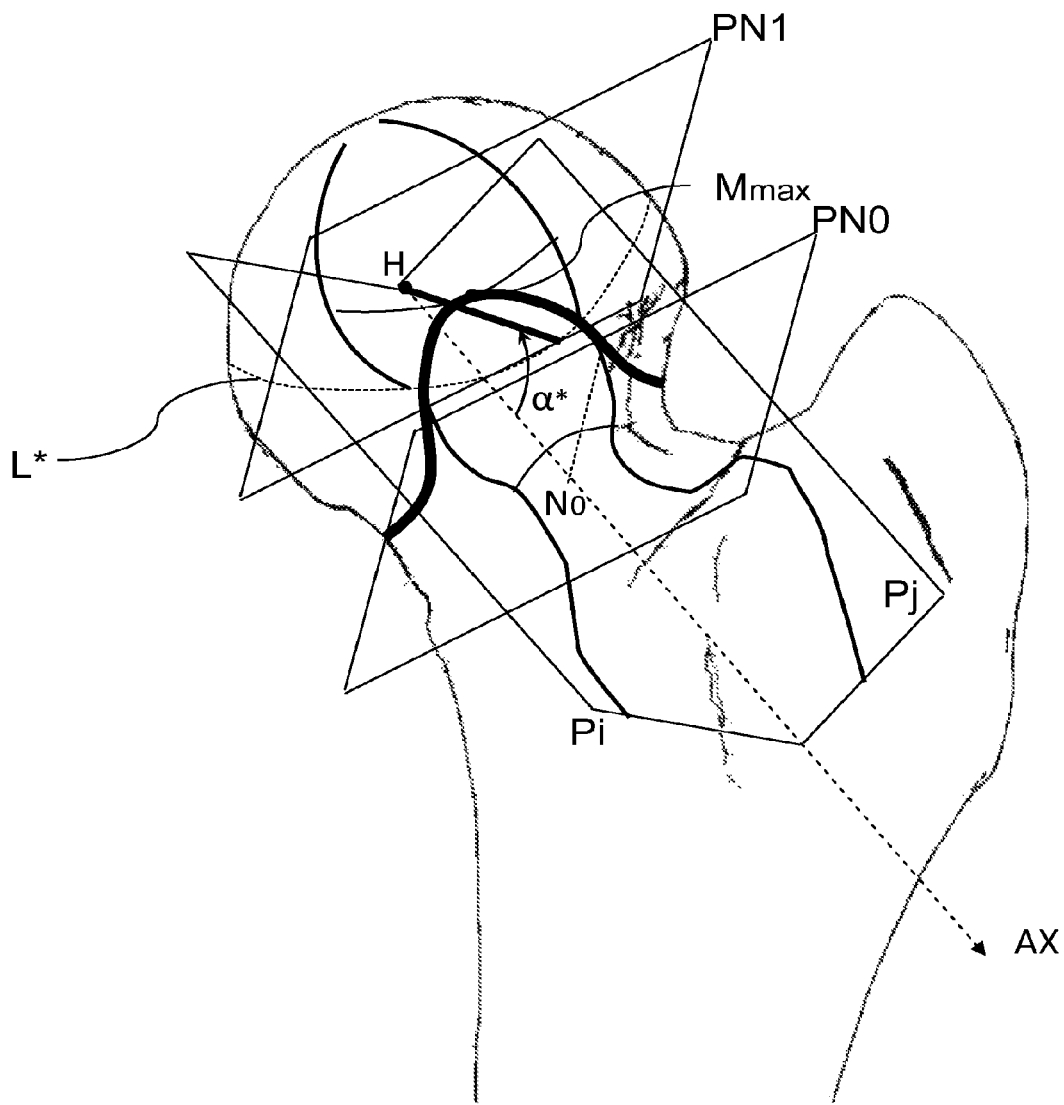
FIG. 11 is a perspective view of the proximal femur showing a boundary box determined by four planes and resulting in the full determination of the 3D correction boundary from two parameters only.

In a preferred embodiment illustrated by FIG. 11, the boundary box BB is determined by four planes delimiting a portion of the 3D bone surface model in the head neck junction area.

In a preferred embodiment, these four planes are fully determined from the first parameter $\alpha^*$ and the second parameter N0 in the following manner:

[a] a proximal plane PN1 is determined as a plane orthogonal to the neck axis AX and passing through the summit point Mmax;

[b] a distal plane PN0 is determined as a plane orthogonal to the neck axis AX and passing at the coordinate value of the parameter N0 on the neck axis;

[c] two radial hemi-planes Pi and Pj around the neck axis and passing at the clock indices i and j defined previously.

The intersection of these four planes with the 3D bone surface model determines the 3D correction boundary in which the corrected surface patches SP1 and SP2 are determined.

Figure 12:
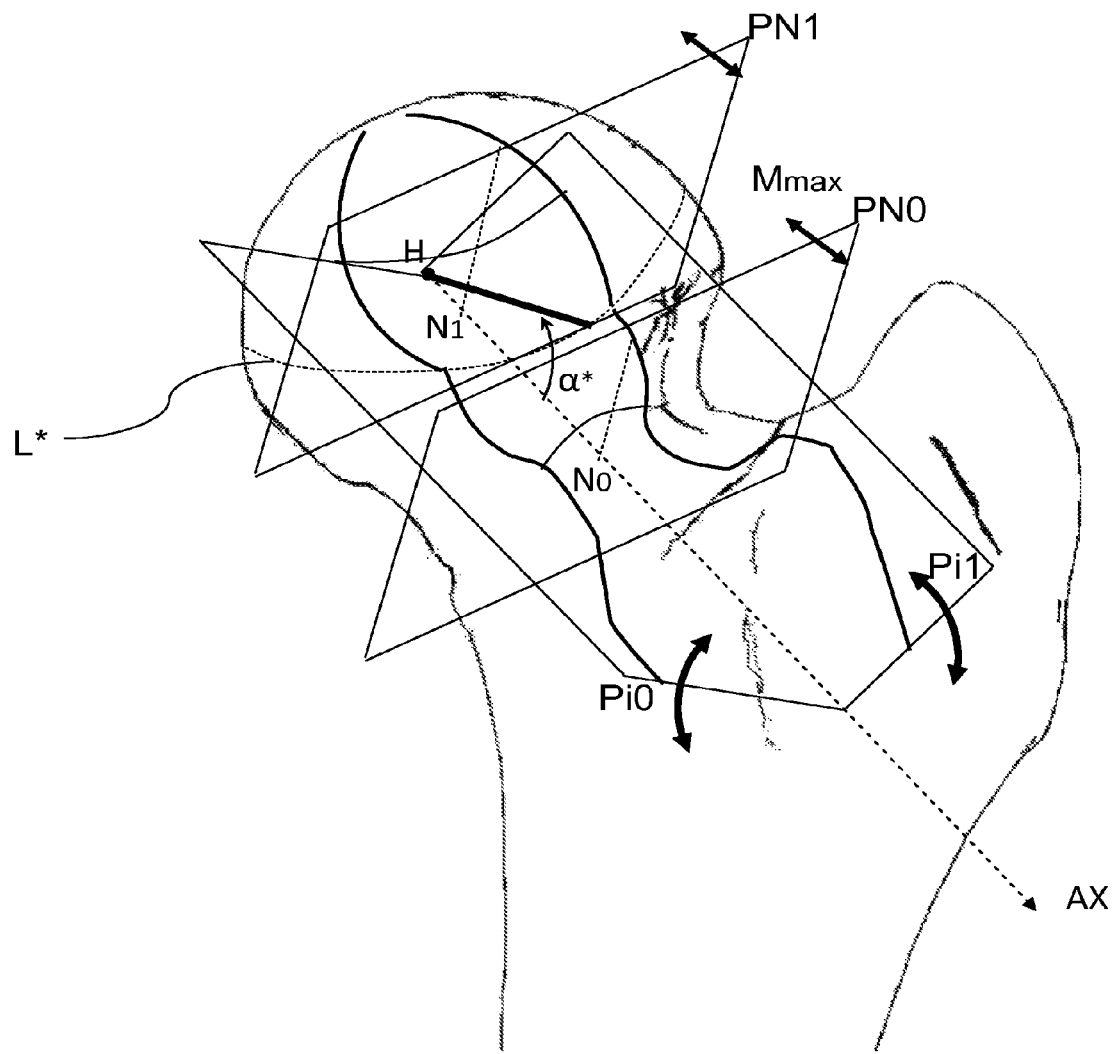
FIG. 12 is a perspective view of the proximal femur illustrating four additional parameters which can be used to control the 3D correction boundary.
Figure 13A:
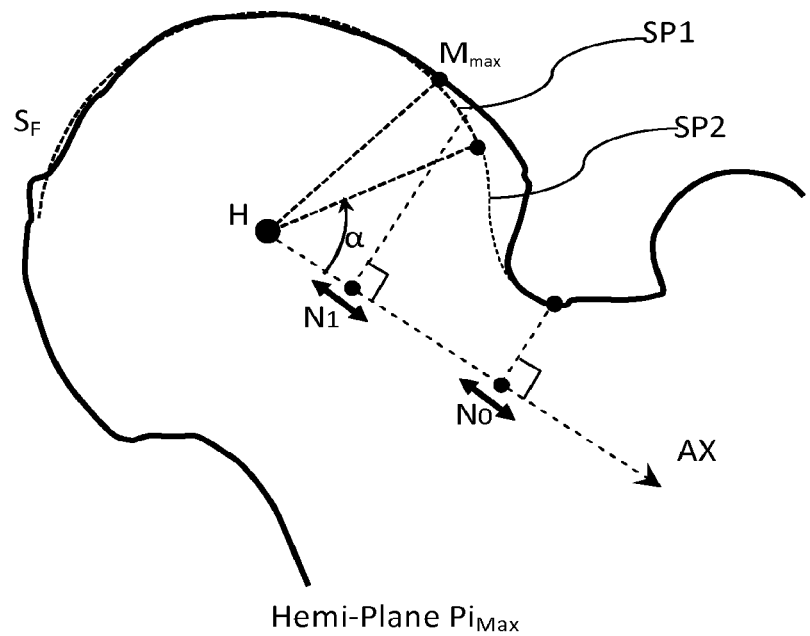
FIGS. 13A and 13B are respectively zoomed cross-sectional radial and axial views of the proximal femur illustrating the full control of the 3D correction boundary and the 3D shape of the corrected surface by a five parameters.
Figure 13B:
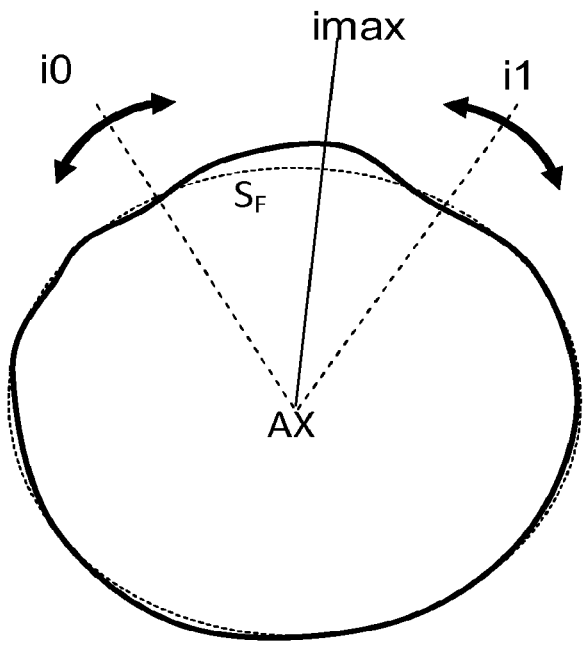
Figure 14:
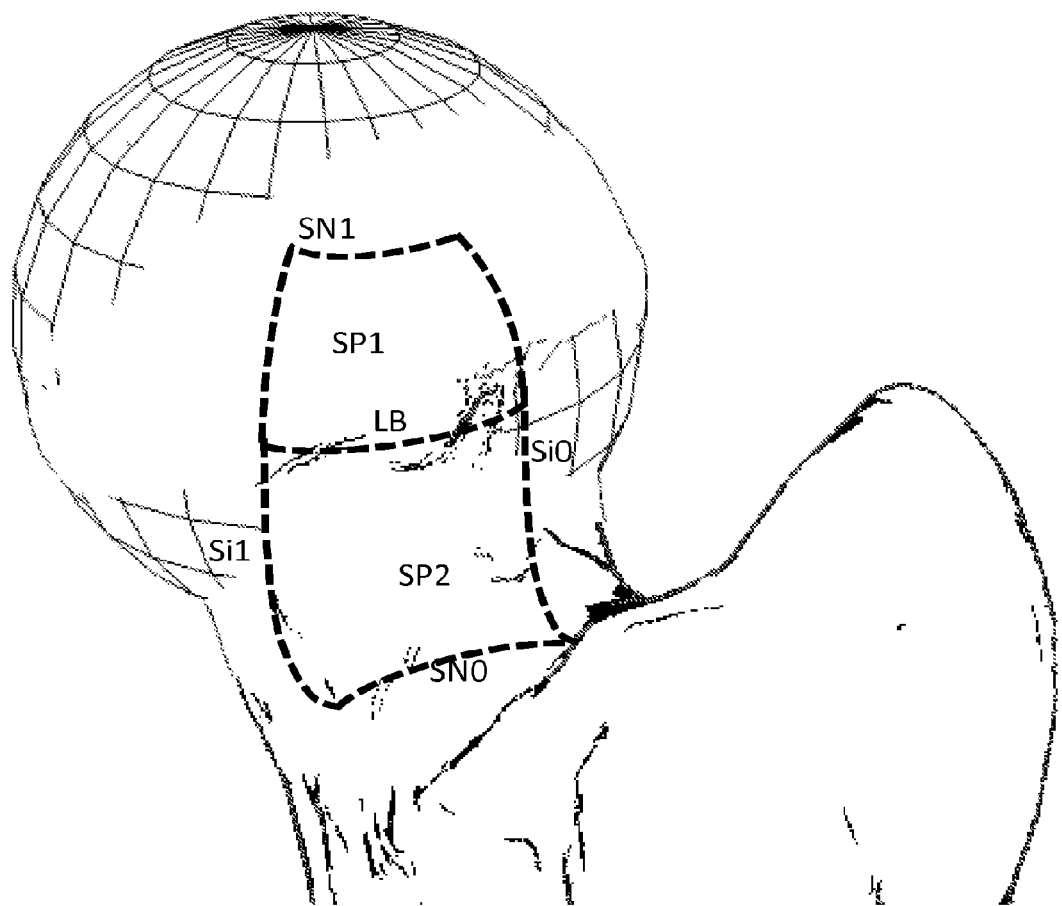
FIG. 14 is a perspective view of the proximal femur illustrating the determination of the 3D correction boundary its border curves from the parameterization of the 3D correction boundary its border by the five parameters of FIGS. 13A and 13B.

In another preferred embodiment, as illustrated in FIG. 12, these four planes are adjustable and their positions are determined from other parameters of the invention, enabling the adjustment of their positions, as illustrated in the radial cross-sectional view around the neck axis of FIG. 13A and in the axial cross-sectional view orthogonal to the neck axis of FIG. 13B, in the following manner:

[a] the position of the proximal plane PN1 is adjustable according to the adjustable position of the coordinate point N1 on the neck axis,

[b] the position of the distal plane PN0 is adjustable according to the adjustable position of the coordinate point N0 on the neck axis,

[c] the position of the two radial hemi-planes Pi0 and Pi1 are adjustable respectively according to the adjustable position of the clock indices i0 and i1 on the clock face referential;

The five parameters $\alpha^*$, i0, i1, N0 and N1, completely define the 3D correction boundary in order to obtain a desired degree of sphericity $\alpha^*$ and a smooth transition to the neck. The corrected bone surface is composed of the proximal surface patch SP1, which is spherical, and the distal surface patch SP2, which is a 3D smooth transition surface. The proximal and distal patches are determined by the boundary curve BC comprising four 3D edge curves and the boundary LB defined from the parallel L*, as illustrated in FIG. 14 and defined as follows:

[A] the intersection curve Si0 between the plane Pi0 and the femur bone surface is the first clock extent edge;

[B] the intersection curve Si1 between the plane Pi1 and the femur bone surface is the second clock extent edge;

[C] the intersection curve SN0 between the plane PN0 and the femur bone surface is the distal edge;

[D] the intersection curve SN1 between the plane PN1 and the femur bone surface is the proximal edge; and

[E] the boundary curve LB defined from the parallel L* corresponding to the target alpha angle $\alpha^*$.

Figure 15A:
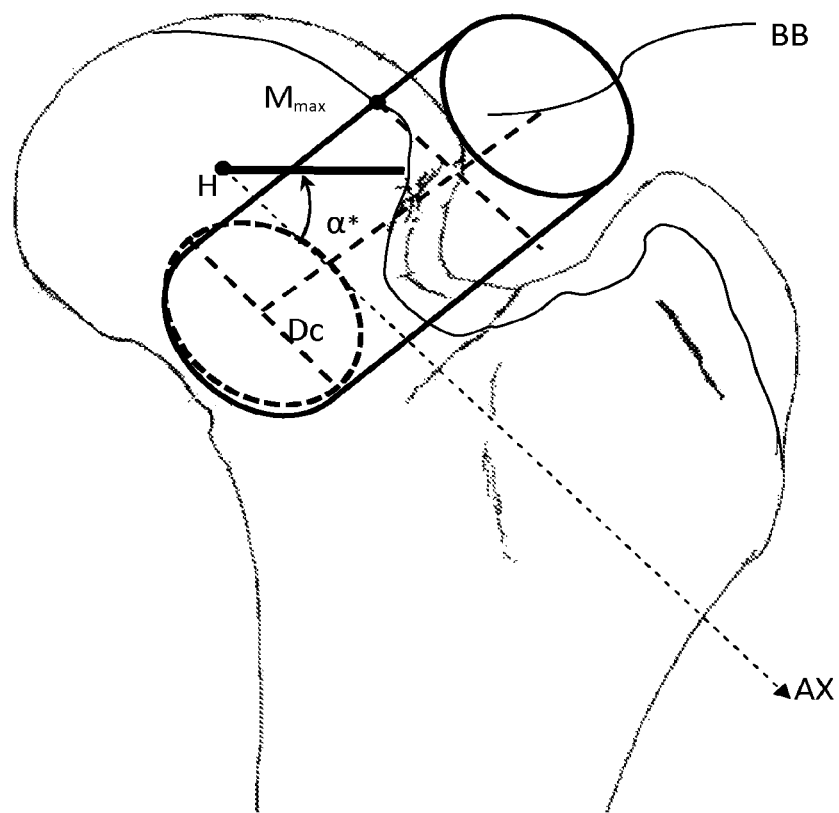
FIG. 15A illustrates the determination of the 3D boundary box as a cylinder.
Figure 15B:
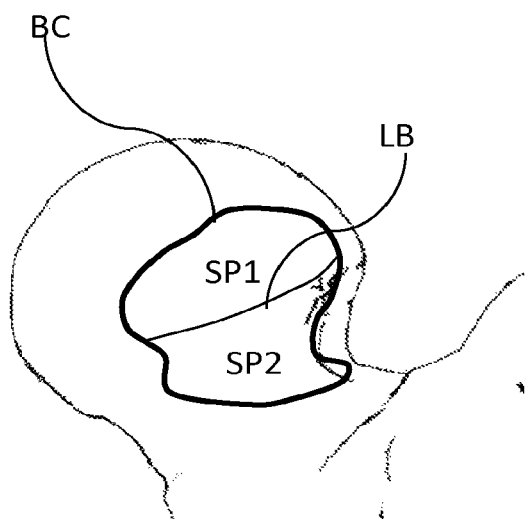
FIG. 15B illustrates the determination of the 3D boundary curve on the 3D bone surface resulting in the intersection of the cylinder described in FIG. 15A with the 3D bone surface.

In another preferred embodiment, the boundary box BB is determined by a right circular cylinder, as illustrated in FIG. 15A. The cylinder is defined by a long axis orthogonal to the neck axis AX, and a diameter of the circular base of the right circular cylinder. The long axis of the cylinder is positioned so that the wall of the right circular cylinder is tangent to the point Mmax previously determined. The diameter of the cylinder base Dc determines a parameter of the boundary box BB, which preferred value is equal to the diameter of the femoral head sphere described earlier. For that embodiment, the boundary curve BC defines a smooth 3D skew curve with no sharp edges as illustrated in FIG. 15B. The same construction of the spherical surface patch SP1 and the smooth transition surface patch SP2 as described above is applied with the definition of the new boundary curve BC. Hence, the two parameters α* and the diameter of the cylinder base Dc define completely the corrected bone surface in order to obtain a desired degree of sphericity α* and a smooth transition to the neck. Other parameters can be added to control the orientation and position of the axis of the cylinder.

Figure 16A:
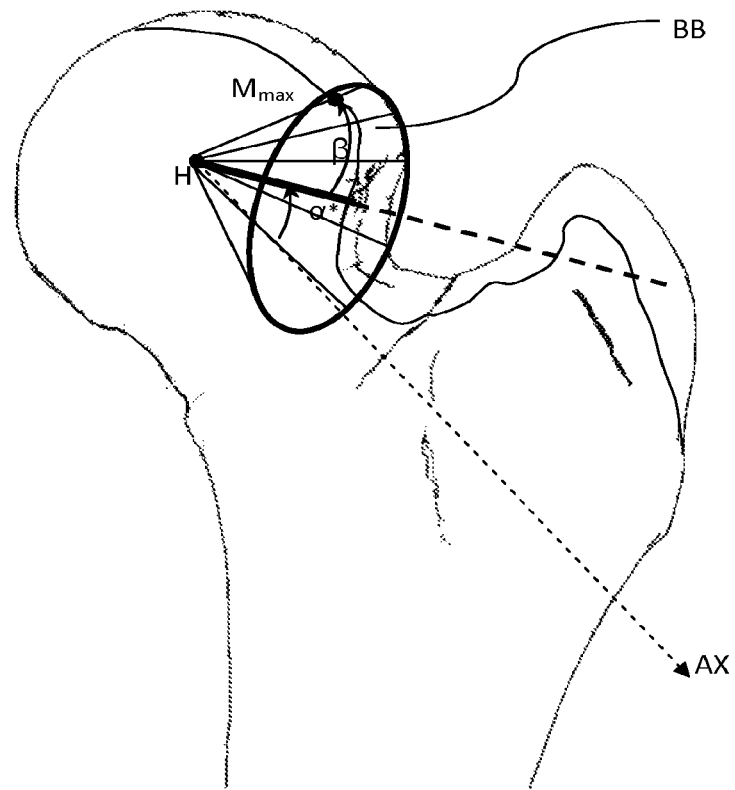
FIG. 16A illustrates the determination 3D boundary box as a cone.
Figure 16B:
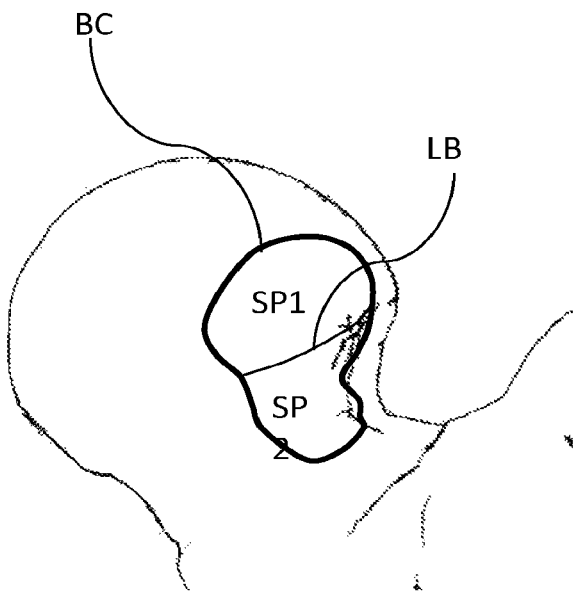
FIG. 16B illustrates the determination of a 3D boundary curve on the 3D bone surface resulting in the intersection of the cone described in FIG. 16A with the 3D bone surface.

In a similar manner, in another preferred embodiment illustrated in FIG. 16A, the boundary box BB is determined by a solid cone, the size and position of which are determined as follows. The cone has an axis, which is determined by the radius line of the femoral head sphere SF corresponding to the target angle α*, and comprised in the plane PMax earlier determined. The solid angle 13 of the cone determines a parameter of the boundary box BB, which preferred value is chosen such that the point Mmax is inside the cone. Again, as illustrated in FIG. 16B, the boundary curve BC defines a smooth 3D skew curve with no sharp edges. The same construction of the spherical surface patch SP1 and the smooth transition surface patch SP2 as described above is applied with the definition of the new boundary curve BC. Hence, the two parameters α* and solid angle 13 of the cone completely define the corrected bone surface in order to obtain a desired degree of sphericity α* and a smooth transition to the neck. Other parameters can be added to control the orientation and the axis of the cone.

In similar manner, any type of geometrical volume for which the position and size can be parameterized relatively to the 3D bone surface model or specific anatomical landmarks can define a bounding box BB, the intersection of which with the 3D bone surface model results in a boundary curve BC. The surface determined by this boundary curve BC is parted into two portions by the parallel L*, which defines the degree of sphericity of the corrected bone surface. Inside the proximal boundary, the 3D corrected surface is a spherical surface patch, and inside the distal boundary, the 3D corrected surface is a smooth transition surface patch. The desired degree of continuity can be defined on each boundary edge.

Figure 17A:
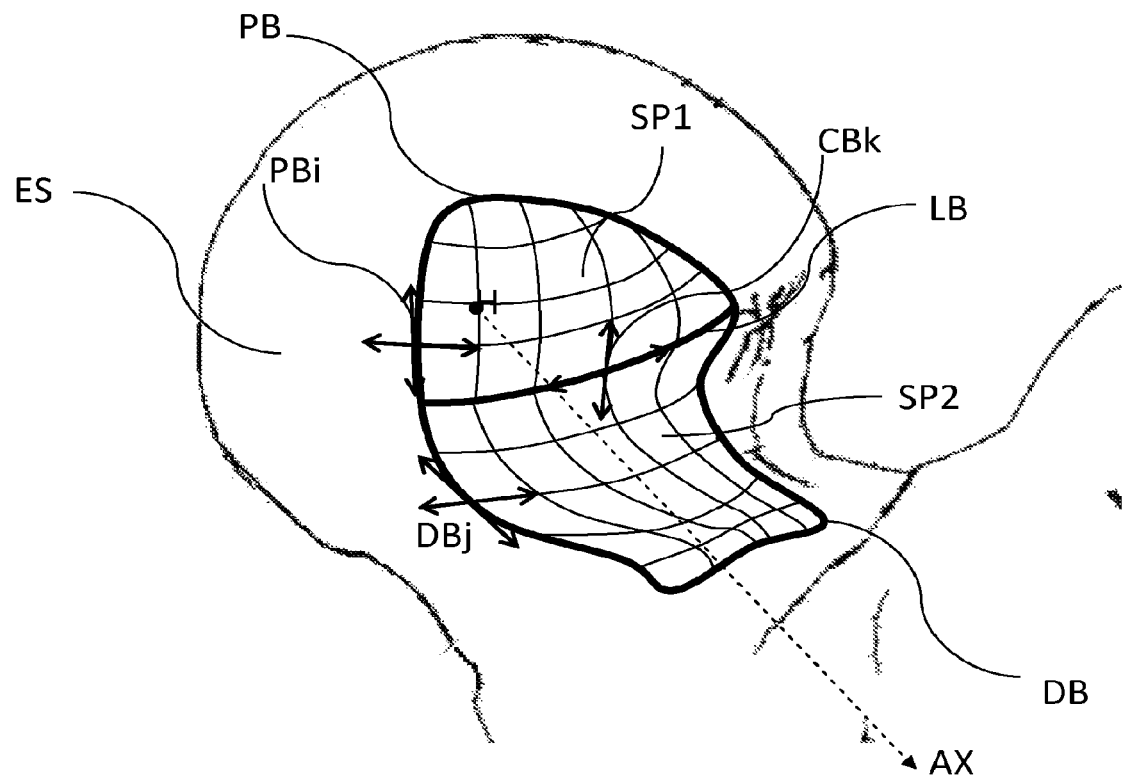
FIG. 17A is a perspective view of the proximal femur illustrating the determination of the 3D corrected surface patches using 3D surface spline models.

As illustrated in FIG. 17A, once the 3D correction boundary has been determined, the surface patches SP1 and SP2 can be fully determined, the 3D spherical corrected surface patch SP1 describing a portion of the sphere SF inside the proximal boundary PB and the 3D smooth transition corrected surface patch SP2 describing a surface inside the distal boundary DB, the common boundary LB between both surface patches being supported by the parallel L* of latitude α*.

Figure 17B:
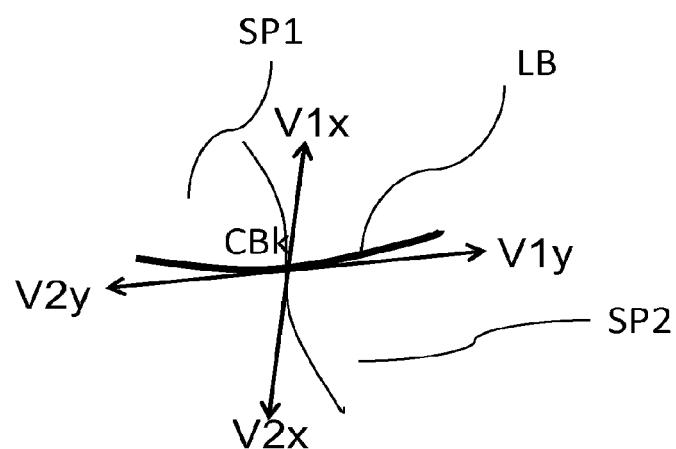
FIG. 17B is a zoomed view on a point on the 3D surface spine model at the junction of the spherical corrected surface patch and the smooth transition corrected surface patch, illustrating the continuity between the surface and surfaces tangents of both patches.

In a preferred embodiment, the surface patch SP2 can be constructed for example from a 3D surface spline model, such that SP2 is continuous with SP1 and SP2 surface tangents are continuous with SP1 surface tangents along the common boundary LB. This continuity of surface and surface tangents is illustrated in the zoomed view of FIG. 17B at the location of a point CBk of the 3D surface spline of the surface patch SP2 on the common boundary LB. The continuity is carried out at each point CBk by imposing local constraints on the 3D surface spline such that the surface points CBk are located on the boundary LB, and that surface tangent vectors V2x and V2y of the 3D surface spline are parallel respectively to the surface tangent vectors V1x and V1y of the spherical surface patch SP1 and orientated in the opposite direction It is easily understood from the man of the art that this construction of the 3D surface spline along the boundary LB can be transposed to the other points of the distal boundary DB, such that the 3D surface spline is continuous at each point DBj with the external 3D bone surface model ES, and the surface tangents of the 3D surface spline are continuous at each point DBj with the surface tangents of the external 3D bone surface model ES. The distal surface patch SP2 is constructed for instance by using mathematical 3D surface patch models like Bezier surface spline models for example.

Optimally, in another preferred embodiment, since the femoral head surface outside the proximal boundary PB does not match perfectly the sphere SF, the proximal surface patch SP1 can also be determined from a 3D surface spline model so to control the surface continuity and the surface tangents continuity between SP1 and the external 3D bone surface model ES, along the proximal boundary PB. As previously exposed, it is easily understood from the man of the art that the construction of the 3D surface spline of the surface patch SP2 can be transposed for the construction of the 3D spline of the surface patch SP1, such that the 3D spline of the surface patch SP1 is continuous at each point PBi along the proximal boundary PB with the external 3D bone surface model ES, and the surface tangents of the 3D spline of the surface patch SP1 are continuous at each point PBi with the surface tangents of the external 3D bone surface model ES.

In a preferred embodiment where the 3D correction boundary is determined from a set of four planes as described previously, and as illustrated in FIG. 14, the proximal surface patch SP1 is determined as a portion of the sphere SF, limited by Si0, Si1, SN1 and LB. Along the limit LB, SP1 is continuous to the distal surface patch SP2 delimited by Si0, Si1, L* and SN0. The distal surface patch SP2 is a smooth surface that smoothly connects the proximal surface patch SP1 to the non-corrected part of the bone.

In a preferred embodiment, the proximal surface patch SP1 is continuous with the femur 3D bone surface at the edge curves Si0, Si1, SN, and the distal surface patch SP2 is continuous with the femur 3D bone surface at the edge curves Si0, Si1, SN0 and LB. Optimally, SP1 and SP2 can be determined with construction constraints such that the surface tangents are also continuous with the tangents to the femur 3D bone surface at the loci of the four edge curves Si0, Si1, SN0 and SN1. Optimally the distal surface patch SP2 tangents are also continuous with the surface tangent of the proximal surface patch SP1 at the locus of LB. Continuity of the second derivatives of the surfaces can also be a possible constraint to create very smooth transitions at the location of the 5 edge curves Si0, Si1, SN0, SN1 and LB. Several mathematical models of interpolation can therefore be used to define first and second portions SP1 and SP2 in order to meet these constraints.

Figure 18A:
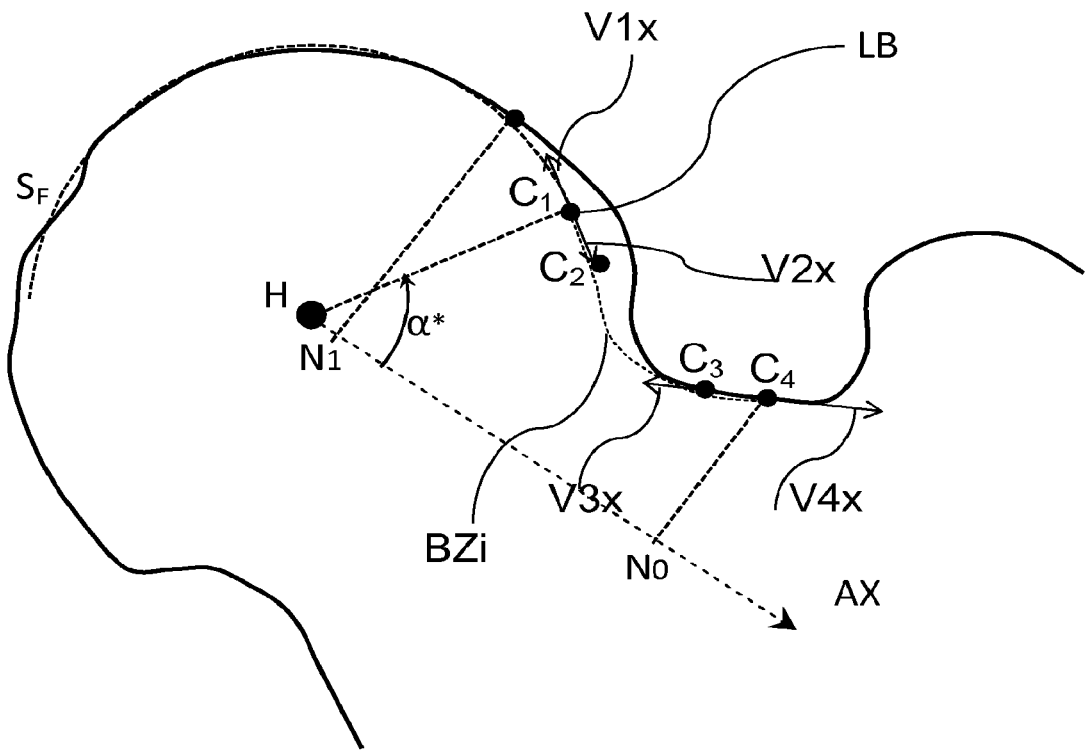
FIG. 18A is a perspective view of the proximal femur illustrating the construction of the 3D surface spline of the smooth transition corrected surface patch using surface interpolation between a set of radial 3D Bezier curves.
Figure 18B:
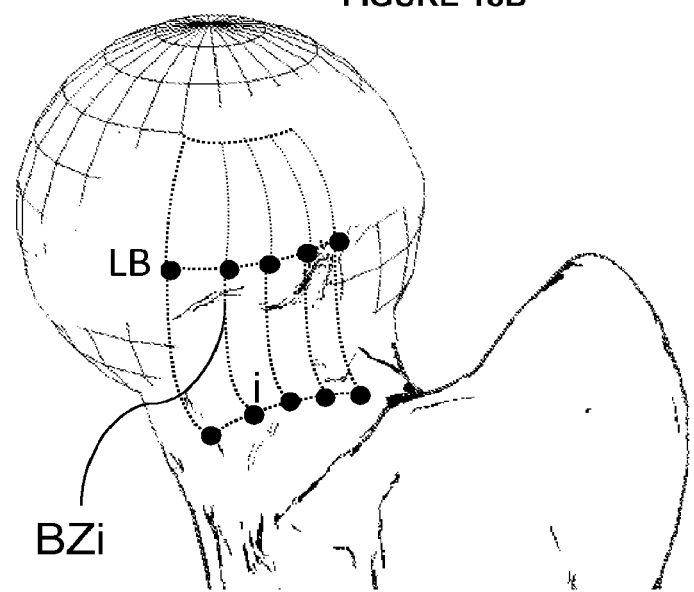
FIG. 18B is a zoomed cross-sectional radial view illustrating the construction of the 3D Bezier curve from Bezier control points in one radial hemi-plane.

In a preferred embodiment, and as illustrated in FIG. 18A, the distal surface patch SP2 is constructed by interpolating 3D surface spline models from a set of radial 3D Bezier curves BZi at regular intervals along the clock face referential. As illustrated in FIG. 18B, each 3D Bezier curve BZi is defined in the hemi-radial plane Pi by four control points C1, C2, C3, C4 determined as follows:

[a] the proximal extremity control point C1 is positioned on the common boundary LB defined by the parallel L* of latitude α*;

[b] the proximal tangent control point C2 is positioned so as to form with C1 a vector V2x parallel to the tangent vector V1x of the spherical portion SP1 and in the opposite direction;

[c] the distal extremity point C4 is positioned on the 3D bone surface model along the distal boundary;

[d] the distal tangent control point C3 is positioned on the 3D bone surface model, shifted from the position of C4 proximally along the neck axis direction, by a predefined coefficient, such that the surface tangent vector V3x of the Bezier curve BZi at the location of the extremity point C4 is parallel to the surface tangent vector V4x of the 3D bone surface model and in the opposite direction;

To go further in the description of the 3D corrected surface, in some pathology cases, it can be important to deepen the 3D smooth transition corrected surface just below the junction with the 3D spherical corrected surface to increase the mobility of the femoral head into the socket bone. To enable this type of transition, in another preferred embodiment, another parameter of the method consists of a radial vector field issued from points on the common boundary LB at regular intervals, to control the slope of the 3D smooth transition corrected surface patch SP2 along the common boundary LB.

Figure 19A:
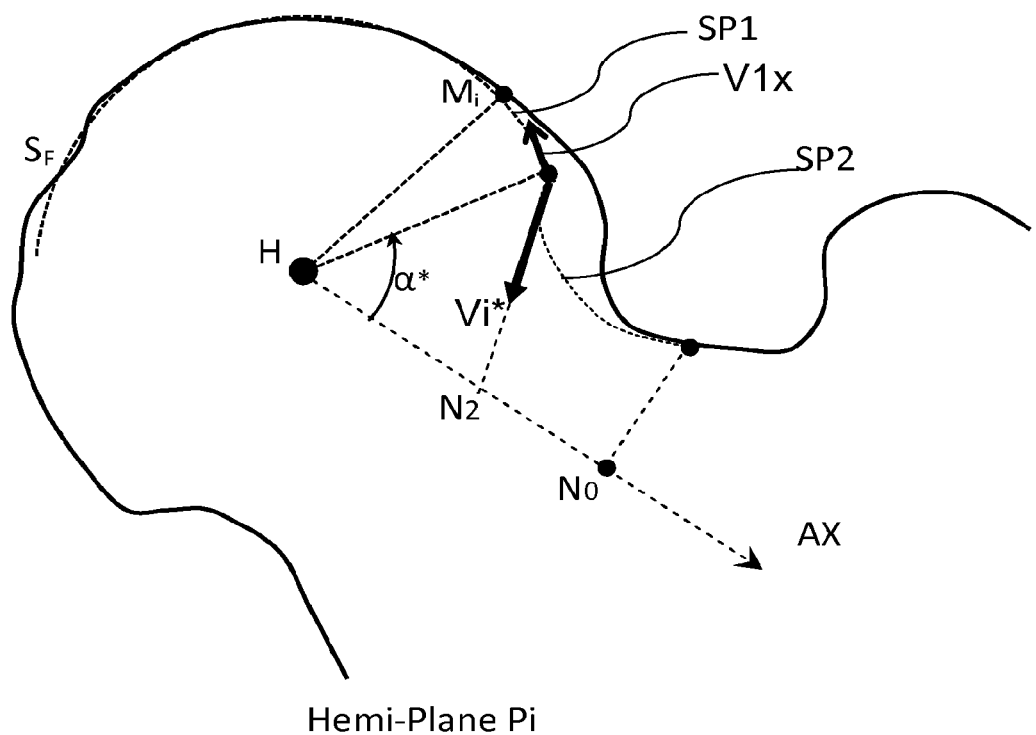
FIGS. 19A and 19B are respectively zoomed cross-sectional radial and axial views of the proximal femur illustrating the use of other parameters to control the surface curvature at the junction of the 3D spherical corrected surface patch and the 3D smooth transition corrected surface patch.
Figure 19B:
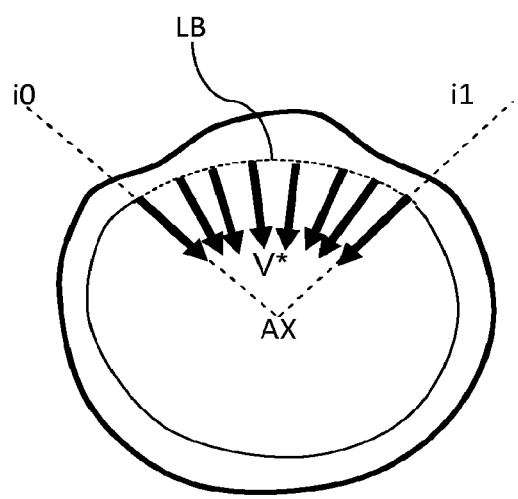

As illustrated on FIGS. 19A and 19B, the radial vector field V* is constituted of the set of vectors V*i determined in radial hemi-planes Pi at regular intervals between the clock indices i0 and i1. All vectors Vi* are orientated towards a point of coordinate N2 on the neck axis, the set of vectors Vi* determining the surface tangents of the 3D corrected surface patch SP2 along the common boundary LB. When the coordinate N2 is adjusted along the neck axis, each vector Vi* deviates from the surface tangent V1x of the 3D spherical surface patch SP1, thus generating an edge in the 3D corrected surface, along the common boundary LB. In another embodiment, the length of the vectors Vi* of the radial vector field V* can also be another parameter to control the height of the edge along the common boundary LB.

In a preferred embodiment, the value of the parameter α* is set to an arbitrary value such as 45° for example, which is a common target value used by surgeons, and other parameters are then defined automatically accordingly to the methods described above. The corrected bone surface is thus entirely determined automatically.

In another preferred embodiment, the value of the parameter α* is determined from the sphericity of the femoral head measured on the opposite hip, from 3D medical image.

In another preferred embodiment, the value of the target alpha angle α* parameter is defined interactively by the user in the range [25°; 90° ] in order to obtain a more or less spherical extent of the corrected bone surface. All other parameters are then defined automatically and the corrected bone surface is thus entirely defined.

In another preferred embodiment, any of the parameters α* and the other parameters defining the boundary box are defined interactively by the user in a predefined range, in order to obtain a more or less spherical extent of the corrected bone surface but also more or less extent along the neck axis and more or less extent around the clock.

In another preferred embodiment, any of the parameters α* and the other parameters defining the boundary box and other parameters defining an edge at the junction of the spherical and smooth transition corrected surfaces are defined interactively by the user in a predefined range.

In a preferred embodiment, the determination of the corrected surface patches results in the computation of a percentage of resection volume in the neck-junction portion.

In another preferred embodiment, the determination of the corrected surface patches results in the computation of a restored offset value computed as the maximum of the distances determined in the hemi-radial planes of the correction clock interval as the distance between two straight lines parallel to the neck axis, one of the line passing through the highest point of the head contour, the other line passing at the lowest point of the corrected surface of the neck.

The method can be implemented in software running on a standard computer. The user can interact with the software by a standard user interface medium like a mouse, touch screen or the like. Images are displayed on the monitor of the computer. At the beginning, the software is used to select and load the 3D image of the specific patient.

The software is intended to determine the optimal corrected bone surface of a deformed articulation bone surface, the bone comprising a head and a neck.

In a preferred embodiment, the software is intended to determine the optimal corrected bone surface of a bump on a bone.

Description with the femur head-neck junction in the case of Femoro-Acetabular Impingement (FAI) is illustrative and easily adaptable for other bones with head-neck junction. Also, the method is detailed for 3D CT images but it can be extended to other 3D image modality as MRI for example.

ADVANTAGES

The invention offers a method for easy, accurate and reproducible determination of a bone resection of a deformed bone surface. The proposed method is based on automatic determination of parameters values in order to determine the optimal resection. The method determines automatically the boundary of the bone area to be resected. The method also determines automatically a shape for the corrected surface respecting sphericity increase of the head of the bone and smooth transition at the neck of the bone. Simple user interaction over a limited number of parameters is possible to fine tune or customize the proposal for the bone resection.

The invention claimed is:

1. A method for non-invasive reproducible determination of a surface on a 3D bone surface model constructed from 3D medical image of a bone having a deformation; the bone comprising a head portion contiguous to a neck portion, and the bone deformation comprising in a bump overgrowth at the head-neck junction; the method comprising:
   receiving a corrected surface on a 3D bone surface model, wherein said corrected surface comprises:
   i. a 3D spherical corrected surface patch on the head portion of said 3D bone surface model, and
   ii. a 3D smooth transition corrected surface patch on the neck portion of said 3D bone surface model, contiguous to said 3D spherical corrected surface patch; and wherein said corrected surface patches are defined by a set of parameters comprising:
   iii. at least one first parameter (0*) representing a spherical extent value of said 3D spherical corrected surface patch,
   iv. and a set of at least one second parameter in addition to said first parameter:
   determining the 3D correction boundary of said corrected surface patches, such that said corrected surface patches are continuous with said 3D bone surface model along said boundary, and such that the surface tangents to said corrected surface patches along said boundary are continuous with the surface tangents to said 3D bone surface model outside said boundary.

2. The method of claim 1, wherein the set of parameters comprises said first and second parameters.

3. The method of claim 1, further comprising steps for the determination from said 3D bone surface model of geometrical elements characterizing the anatomy of the bone, said geometrical elements including a sphere fitted to the spherical portion of head and a neck axis, and wherein said first parameter (0*) is a target angle, expected to be achieved after surgery, measured radially between the hemiline issued from the center of the fitted sphere and orientated distally along the neck axis, and a radius of the fitted sphere, and said at least second parameter defines the extent on the 3D bone surface model of said 3D correction boundary.

4. The method of claim 3, further comprising the following steps:
   i. determining from said 3D bone surface model and from said geometrical elements characterizing the anatomy of the bone, a clock face referential on the head portion of the bone rotating around the neck axis;
   ii. determining a 3D head-neck junction curve on the 3D bone surface model characterizing the head-neck junction of the bone around the clock face referential; and
   iii. determining from said 3D head-neck junction curve a summit point characterizing the maximum of the bump deformation; said summit point being the point of said 3D head-neck junction curve closest to the apex point of the spherical portion of the head of the bone; and wherein the 3D correction boundary proximally extends up to said summit point.

5. The method of claim 1, further comprising the following steps:
   i. determining the parallel of latitude a* of the fitted sphere;
   ii. determining two radial hemi-planes containing the neck axis and passing respectively at the intersection of said parallel of latitude a* and the 3D head-neck junction curve; the clock indices of these two hemi-planes on said clock face referential determining a correction clock interval;
   iii. determining on the 3D bone surface model a closed contour around the summit point of the 3D head-neck junction curve, which contour extends at least distally to the parallel whose latitude is the first parallel, and covers at least radially the correction clock interval, the closed contour being the 3D correction boundary; and covers at least radially the correction clock interval, the covers at least radially the correction clock interval, said closed contour being the 3D boundary.

6. The method of claim 5, wherein the closed contour on the 3D bone surface model defining the 3D correction boundary comprises the intersection of the 3D bone surface model with a 3D boundary box, said 3D boundary box being a geometrical 3D construction defined from at least the second parameter.

7. The method of claim 6, wherein said 3D boundary box is a polyhedron.

8. The method of claim 7, wherein said polyhedron is a geometrical construction delimited by the limits comprising:
   i. a proximal limit defined by a portion of the intersection of the 3D bone surface model with a plane orthogonal to the neck axis and passing through the summit point of the 3D head-neck junction curve included in the correction interval;
   ii. two radial limits defined by the two bone contours defined respectively as the intersection of the 3D bone surface model by the two hemi-planes determining the correction clock interval;
   iii. a distal limit defined by a 3D neck curve defined as the intersection of the 3D surface model by a plane orthogonal to the neck axis; the coordinate position along the neck axis defining a proximal point being the at least second parameter and which is located further down in the neck direction at a distance of at least the fitted sphere radius from the fitted sphere center;
the 3D correction boundary being fully determined from the couple of parameters (a*, proximal point).

9. The method of claim 8, wherein said set of at least one second parameter includes two adjustable clock indices controlling the extent of the correction clock interval; wherein the two radial hemi-planes corresponding to these two indices produce new intersection contours with the 3D surface model, the radial limits of the 3D correction boundary being constituted by said new intersection contours; the 3D correction boundary being fully determined from the quartet of parameters (a*, proximal point, first clock index, second clock index).

10. The method of claim 8, wherein said set of at least one second parameter includes an adjustable distal point on the neck axis determining a distal adjustable plane orthogonal to the neck axis and intersecting the 3D surface model on the distal portion of the femoral neck, thus producing a new distal limit; the adjustable distal point being positioned between the coordinate on the neck axis of the plane passing through the parallel of latitude a* and a predefined max distal coordinate on the neck axis; the 3D correction boundary being fully determined from the triplet of parameters (a*, proximal point, distal point).

11. The method of claim 8, wherein said set of at least one second parameter includes any of the set of adjustable parameters defined in claim 9; which combination controls the extent of the 3D correction boundary; the 3D correction boundary being fully determined from the set of 5 parameters being (a*, proximal point, distal point, clock index 1, clock index 2).

12. The method of claim 6, wherein the 3D boundary box is a cylinder constructed by the following steps:
   i. determining a summit radial hemi-plane passing through the neck axis and said summit point of the 3D head-neck junction curve;
   ii. determining a radius line of the fitted sphere passing at the intersection of said summit radial hemi-plane and the parallel of latitude a*;
   iii. positioning the cylinder so that its long axis is along the defined radius line;
   iv. determining the diameter of the cylinder so that the intersection curve of the external wall of the cylinder with the 3D surface model extends to cover the clock interval and the summit point.

13. The method of claim 12, wherein said set of at least one second parameter includes an adjustable axis vector, an adjustable axis issue point and an adjustable cylinder radius which determine respectively the orientation, position and size of said cylinder; said axis vector being adjustable from the initial radius line rotating around the center of the fitted sphere and with a predefined 3D angle variation; said axis issue point being adjustable along the neck axis in an interval between the center of the fitted sphere and the coordinate point on the neck axis of the orthogonal plane passing through the parallel of latitude a*; the 3D correction boundary being fully determined from the quartet of parameters (a*, axis vector, axis issue point, cylinder radius).

14. The method of claim 6, wherein the 3D boundary box is a cone constructed by the following steps:

i. determining a summit radial hemi-plane passing through the neck axis and said summit point of the 3D head-neck junction curve;
ii. determining a radius line of the fitted sphere passing at the intersection of said radial hemi-plane and the parallel of latitude a*;
iii. positioning the cone so that its rotational axis is along said radius line and issued from the center of the fitted sphere;
iv. determining the aperture angle of the cone so that the intersection curve of the external wall of the cone with the 3D surface model extends to cover the clock interval and the summit point.

15. The method of claim 14, wherein said set of at least one second parameter includes an adjustable axis vector, an adjustable axis issue point and an adjustable aperture angle which determine respectively the orientation, position and aperture of the cone; said axis vector being adjustable from the initial radius line rotating around the center of the fitted sphere and with a predefined 3D angle variation; said axis issue point being adjustable along the neck axis in an interval between the center of the fitted sphere and the coordinate point on the neck axis of the orthogonal plane passing through the parallel of latitude a*; the 3D correction boundary being fully determined from the quartet of parameters (a*, axis vector, axis issue point, aperture angle).

16. The method of claim 1, wherein the determination of the 3D spherical corrected surface patch and the 3D smooth transition corrected surface patch within the 3D correction boundary comprises the steps of:
   i) splitting the 3D correction boundary in two contiguous regions by the parallel of latitude a*, one distal region on the neck side and one proximal region on the head side, a portion of the parallel of latitude a* forming a common boundary between said two contiguous regions;
   ii) determining the 3D spherical corrected surface patch inside the proximal region as a pure spherical portion of the fitted sphere;
   iii) determining the 3D smooth transition corrected surface patch inside the distal region by a 3D transition surface spline, said 3D transition surface spline being continuous with the 3D spherical corrected surface patch inside the proximal region along the common boundary, and continuous with the 3D bone surface model along its other boundary;
the union of the 3D spherical corrected surface patch and the 3D smooth transition corrected surface patch constituting a 3D corrected surface inside the 3D correction boundary.

17. The method of claim 16, wherein the surface tangents of said 3D transition surface spline are continuous with the surface tangents of the 3D spherical corrected surface patch along the common boundary, and the surface tangents of said 3D transition surface spline are continuous with the surface tangents of the 3D bone surface model along its other boundary.

18. The method of claim 17, wherein the 3D spherical corrected surface patch is further determined by a 3D spherical surface spline, said 3D spherical surface spline being continuous with the 3D smooth transition corrected surface patch along them common boundary and continuous with the 3D bone surface model along its other boundary, and wherein the surface tangents of the 3D spherical corrected surface patch are the tangents of the fitted sphere along the common boundary and the surface tangents of the 3D spherical corrected surface patch are continuous with the tangents of the 3D bone surface model along its other boundary.

19. The method according to claim 16, wherein the surface tangents of said 3D transition surface spline along the common boundary are further adjustable by a radial vector field controlling the surface tangents of said 3D transition spline surface along the common boundary to adjust the curvature at the junction of 3D spherical corrected surface patch and the 3D smooth transition corrected surface patch; all vectors of said radial vector field being issued from regular points located on the common boundary and being orientated towards a point on the neck axis located in the interval from the center of the fitted sphere to a predefined maximum distal point on the neck axis; the adjustable orientation of the vector field towards the center of the femoral head resulting in the emergence of a sharp edge in said 3D corrected surface patch, along the common boundary.

20. The method of claim 19, wherein the length of the radial vector field can also be adjusted to control the height of said emerging sharp edge.

21. The method according to claim 19, wherein the boundary of the distal region is composed of the two following portions:
   i) the common boundary, and
   ii) an external distal boundary being the boundary of the distal region minus the common boundary; and wherein the 3D transition surface spline is constructed from surface interpolation between a set of radial 3D Bezier curves of degree at least 3, located at regular clock intervals on the clock correction interval.

* * * * *